United States Patent
Johnson et al.

(10) Patent No.: US 9,624,350 B2
(45) Date of Patent: *Apr. 18, 2017

(54) ASYMMETRIC FIBER REINFORCED POLYMER TAPE

(71) Applicant: Ticona LLC, Florence, KY (US)

(72) Inventors: Aaron H. Johnson, Winona, MN (US); David W. Eastep, Winona, MN (US); Timothy A. Regan, Winona, MN (US); Timothy L. Tibor, Winona, MN (US)

(73) Assignee: Ticona LLC, Florence, KY (US)

(*) Notice: Subject to any disclaimer, the term of this patent is extended or adjusted under 35 U.S.C. 154(b) by 415 days.

This patent is subject to a terminal disclaimer.

(21) Appl. No.: 13/707,645

(22) Filed: Dec. 7, 2012

(65) Prior Publication Data
US 2014/0005331 A1    Jan. 2, 2014

Related U.S. Application Data

(60) Provisional application No. 61/569,045, filed on Dec. 9, 2011, provisional application No. 61/660,189, filed on Jun. 15, 2012.

(51) Int. Cl.
*H01B 3/30*      (2006.01)
*C08K 3/04*      (2006.01)
(Continued)

(52) U.S. Cl.
CPC ............. *C08K 3/04* (2013.01); *B29B 15/122* (2013.01); *C08J 5/04* (2013.01); *C08J 5/042* (2013.01);
(Continued)

(58) Field of Classification Search
CPC ..... C08J 5/04; C08J 5/042; C08J 5/043; C08J 5/08
(Continued)

(56) References Cited

U.S. PATENT DOCUMENTS 1,078,448 A    11/1913  Marcroft
1,111,500 A     9/1914  Schautz et al.
(Continued)

FOREIGN PATENT DOCUMENTS

DE    19827524 A1    12/1999
EP     0287427 A1    10/1988
(Continued)

OTHER PUBLICATIONS

"Tape". 2011. In the American Heritage Dictionary of the English Language, edited by the Editors of the American Heritage Dictionaries and TheEditorsoftheAmericanHeritageDictionaries. Boston: Houghton Mifflin, http://search.credoreferences.com/content/entry/hmdictenglang/tape/0.

*Primary Examiner* — Jane L Stanley
(74) *Attorney, Agent, or Firm* — Dority & Manning, P.A.

(57) ABSTRACT

An asymmetric tape and a system and method for impregnating at least one fiber roving with a polymer resin to form an asymmetric tape are provided. The asymmetric tape includes a polymer resin, and a plurality of fibers embedded in the polymer resin to form a fiber reinforced polymer material. The fiber reinforced polymer material includes a first surface and an opposing second surface. The fibers are disposed in the fiber reinforced polymer material to form a resin rich portion and a fiber rich portion. The resin rich portion includes the first surface and the fiber rich portion includes the second surface.

10 Claims, 18 Drawing Sheets

(51) Int. Cl.
  *C08K 3/40* (2006.01)
  *C08J 5/04* (2006.01)
  *C08J 5/08* (2006.01)
  *B29B 15/12* (2006.01)
  *B29C 70/06* (2006.01)
  *B29C 70/52* (2006.01)

(52) U.S. Cl.
  CPC ........ *C08J 5/08* (2013.01); *C08K 3/40* (2013.01); *B29C 70/06* (2013.01); *B29C 70/52* (2013.01)

(58) Field of Classification Search
  USPC ............................................................. 524/592
  See application file for complete search history.

(56) References Cited

U.S. PATENT DOCUMENTS

| | | | |
|---|---|---|---|
| 1,898,085 A | 2/1933 | Dreyfus et al. | |
| 3,647,526 A | 3/1972 | Barnes | |
| 3,803,965 A | 4/1974 | Alderfer | |
| 3,934,064 A | 1/1976 | Lowthian | |
| 4,330,494 A * | 5/1982 | Iwata | B29C 44/186 156/79 |
| 4,531,959 A | 7/1985 | Kar et al. | |
| 4,588,538 A | 5/1986 | Chung et al. | |
| 4,643,126 A | 2/1987 | Wilkinson et al. | |
| 4,720,366 A | 1/1988 | Binnersley et al. | |
| 4,721,637 A | 1/1988 | Suzuki | |
| 4,728,387 A | 3/1988 | Hilakos | |
| RE32,772 E | 10/1988 | Hawley | |
| 4,792,481 A * | 12/1988 | O'Connor | B32B 5/28 427/177 |
| 4,864,964 A | 9/1989 | Hilakos | |
| 4,883,625 A | 11/1989 | Glemet et al. | |
| 4,923,134 A | 5/1990 | Kinnan | |
| 4,957,422 A | 9/1990 | Glemet et al. | |
| 4,983,247 A * | 1/1991 | Kim | B29C 33/02 156/272.2 |
| 4,997,703 A | 3/1991 | Gehrig | |
| 5,002,712 A | 3/1991 | Goldmann et al. | |
| 5,068,142 A | 11/1991 | Nose et al. | |
| 5,084,305 A | 1/1992 | Marttila | |
| 5,114,516 A | 5/1992 | Pilling et al. | |
| 5,114,633 A | 5/1992 | Stewart | |
| 5,116,450 A | 5/1992 | Spoo et al. | |
| 5,207,850 A | 5/1993 | Parekh | |
| 5,268,050 A | 12/1993 | Azari | |
| 5,277,566 A | 1/1994 | Augustin et al. | |
| 5,294,461 A | 3/1994 | Ishida | |
| 5,419,957 A * | 5/1995 | Martin | B32B 27/08 156/77 |
| 5,529,652 A | 6/1996 | Asai et al. | |
| 5,783,129 A | 7/1998 | Shirai et al. | |
| 5,798,068 A | 8/1998 | Vlug | |
| 5,799,705 A | 9/1998 | Friedrich | |
| 5,863,332 A | 1/1999 | Foster et al. | |
| 5,895,808 A | 4/1999 | Schmid et al. | |
| 5,935,508 A | 8/1999 | Fernyhough et al. | |
| 5,948,473 A | 9/1999 | Saito et al. | |
| 6,045,876 A | 4/2000 | Fellers et al. | |
| 6,048,598 A | 4/2000 | Bryan, III et al. | |
| 6,090,319 A | 7/2000 | Sharma et al. | |
| 6,117,591 A | 9/2000 | Takeuchi et al. | |
| 6,244,014 B1 | 6/2001 | Barmakian | |
| 6,248,262 B1 | 6/2001 | Kubotera et al. | |
| 6,258,453 B1 | 7/2001 | Montsinger | |
| 6,260,343 B1 | 7/2001 | Pourladian | |
| 6,270,851 B1 | 8/2001 | Lee et al. | |
| 6,286,558 B1 | 9/2001 | Quigley | |
| 6,329,056 B1 | 12/2001 | Deve et al. | |
| 6,334,293 B1 | 1/2002 | Poethke et al. | |
| 6,344,270 B1 | 2/2002 | McCullough et al. | |
| 6,346,325 B1 | 2/2002 | Edwards et al. | |
| 6,391,959 B1 | 5/2002 | Ninomiya et al. | |
| 6,455,143 B1 | 9/2002 | Ishibashi et al. | |
| 6,517,654 B1 | 2/2003 | Heckel et al. | |
| 6,656,316 B1 | 12/2003 | Dyksterhouse | |
| 6,658,836 B2 | 12/2003 | Nguyen et al. | |
| 6,688,338 B2 | 2/2004 | Meli | |
| 6,846,857 B1 | 1/2005 | Lindner | |
| 6,872,343 B2 | 3/2005 | Edwards et al. | |
| 7,015,395 B2 | 3/2006 | Goldsworthy et al. | |
| 7,059,091 B2 | 6/2006 | Paulshus et al. | |
| 7,060,326 B2 | 6/2006 | Hiel et al. | |
| 7,093,416 B2 | 8/2006 | Johnson et al. | |
| 7,131,308 B2 | 11/2006 | McCullough et al. | |
| 7,179,522 B2 | 2/2007 | Hiel et al. | |
| 7,211,319 B2 | 5/2007 | Hiel et al | |
| 7,220,492 B2 | 5/2007 | Fick et al. | |
| 7,291,263 B2 | 11/2007 | Ward et al. | |
| 7,326,854 B2 | 2/2008 | Varkey | |
| 7,368,162 B2 | 5/2008 | Hiel et al. | |
| 7,402,753 B2 | 7/2008 | Varkey et al. | |
| 7,438,971 B2 | 10/2008 | Bryant et al. | |
| 7,650,742 B2 | 1/2010 | Ushijima | |
| 7,705,242 B2 | 4/2010 | Winterhalter | |
| 7,754,966 B2 | 7/2010 | Figenschou | |
| 8,021,752 B2 | 9/2011 | Honda et al. | |
| 8,354,156 B2 | 1/2013 | Taketa et al. | |
| 8,361,265 B2 | 1/2013 | Wadahara et al. | |
| 9,238,347 B2 * | 1/2016 | Nelson | B29C 70/20 |
| 9,394,430 B2 * | 7/2016 | Luo | C08J 5/24 |
| 2001/0010248 A1 | 8/2001 | Vodermayer et al. | |
| 2002/0019182 A1 | 2/2002 | Ishibashi et al. | |
| 2002/0041049 A1 | 4/2002 | McCullough | |
| 2002/0125603 A1 | 9/2002 | Sakai et al. | |
| 2003/0037529 A1 | 2/2003 | Hanna et al. | |
| 2003/0082380 A1 | 5/2003 | Hager et al. | |
| 2003/0157280 A1 | 8/2003 | Boissonnat et al. | |
| 2004/0098963 A1 | 5/2004 | Calleeuw et al. | |
| 2004/0115422 A1 | 6/2004 | Levit et al. | |
| 2004/0182597 A1 | 9/2004 | Smith et al. | |
| 2004/0224590 A1 | 11/2004 | Rawa et al. | |
| 2004/0265558 A1 | 12/2004 | Berard | |
| 2005/0181228 A1 | 8/2005 | McCullough et al. | |
| 2005/0186410 A1 | 8/2005 | Bryant et al. | |
| 2005/0244231 A1 | 11/2005 | Liao et al. | |
| 2006/0021729 A1 | 2/2006 | Werner et al. | |
| 2006/0024489 A1 | 2/2006 | Werner et al. | |
| 2006/0024490 A1 | 2/2006 | Werner et al. | |
| 2006/0049541 A1 | 3/2006 | Sutton et al. | |
| 2006/0204739 A1 | 9/2006 | Papke et al. | |
| 2007/0128435 A1 | 6/2007 | Hiel et al. | |
| 2007/0193767 A1 | 8/2007 | Guery et al. | |
| 2007/0202331 A1 | 8/2007 | Davis et al. | |
| 2007/0269645 A1 | 11/2007 | Raghavendran et al. | |
| 2007/0271897 A1 | 11/2007 | Hanna et al. | |
| 2008/0006337 A1 | 1/2008 | Quigley et al. | |
| 2008/0141614 A1 | 6/2008 | Knouff et al. | |
| 2008/0250631 A1 | 10/2008 | Buckley | |
| 2008/0282664 A1 | 11/2008 | Chou | |
| 2008/0282666 A1 | 11/2008 | Chou | |
| 2009/0229452 A1 | 9/2009 | Milwich et al. | |
| 2010/0021718 A1* | 1/2010 | Vos et al. | 428/315.9 |
| 2010/0038112 A1 | 2/2010 | Grether | |
| 2010/0163275 A1 | 7/2010 | Hiel et al. | |
| 2010/0181012 A1 | 7/2010 | Hiel et al. | |
| 2010/0206606 A1 | 8/2010 | Winterhalter | |
| 2010/0263761 A1 | 10/2010 | Niccolls | |
| 2011/0097575 A1* | 4/2011 | Pratte et al. | 428/336 |
| 2011/0284117 A1 | 11/2011 | Ansell | |
| 2012/0273988 A1 | 11/2012 | Eastep et al. | |
| 2012/0321804 A1 | 12/2012 | Regan et al. | |
| 2013/0145986 A1 | 6/2013 | Regan | |
| 2013/0147082 A1 | 6/2013 | Johnson et al. | |
| 2013/0147083 A1 | 6/2013 | Eastep et al. | |
| 2013/0147084 A1 | 6/2013 | Johnson et al. | |
| 2013/0333780 A1* | 12/2013 | Chan | 137/561 R |
| 2014/0212650 A1* | 7/2014 | Johnson et al. | 428/300.1 |

FOREIGN PATENT DOCUMENTS

| | | |
|---|---|---|
| EP | 0312842 A2 | 10/1988 |
| EP | 0320653 A2 | 11/1988 |

(56) References Cited

FOREIGN PATENT DOCUMENTS

| | | |
|---|---|---|
| EP | 0383290 A1 | 8/1990 |
| EP | 0415517 A1 | 3/1991 |
| EP | 0520347 A1 | 12/1992 |
| EP | 0707939 A2 | 4/1996 |
| EP | 0712716 A1 | 5/1996 |
| EP | 1291332 A2 | 3/2003 |
| EP | 1775092 A1 | 4/2007 |
| EP | 1790448 A1 | 5/2007 |
| FR | 2 836 591 A1 | 8/2003 |
| GB | 2240997 A | 8/1991 |
| JP | 58 138616 A | 8/1983 |
| JP | 3119188 | 5/1991 |
| JP | 5033278 | 7/1991 |
| JP | 5148780 | 11/1991 |
| JP | 5 050432 A | 3/1993 |
| JP | 7279940 | 10/1995 |
| JP | 11348140 A | 12/1999 |
| JP | 300935 A | 10/2001 |
| JP | 2004-300609 | 10/2004 |
| WO | WO 99/57413 | 11/1999 |
| WO | WO99/67561 A1 | 12/1999 |
| WO | WO 2004/026565 A1 | 4/2004 |
| WO | WO 2004/080698 A1 | 9/2004 |
| WO | WO 2008/075964 A1 | 6/2008 |
| WO | WO 2009/130525 A1 | 10/2009 |
| WO | WO 2011/163349 A2 | 12/2011 |
| WO | WO 2011/163365 A2 | 12/2011 |
| WO | WO 2011/1633357 A2 | 12/2011 |
| WO | WO2012/072993 A2 | 6/2012 |
| WO | WO2012/149127 A1 | 11/2012 |

* cited by examiner

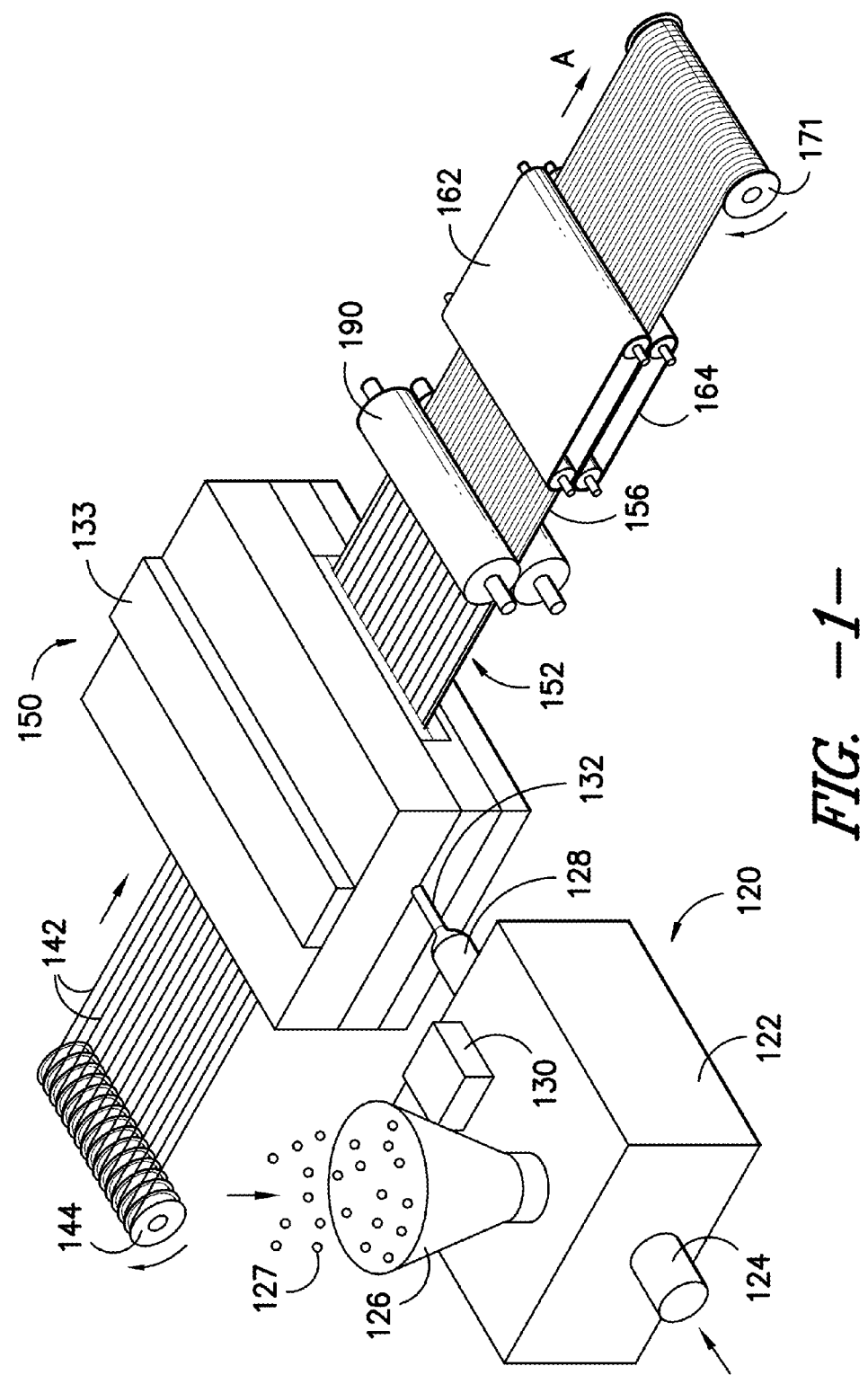
FIG. -1-

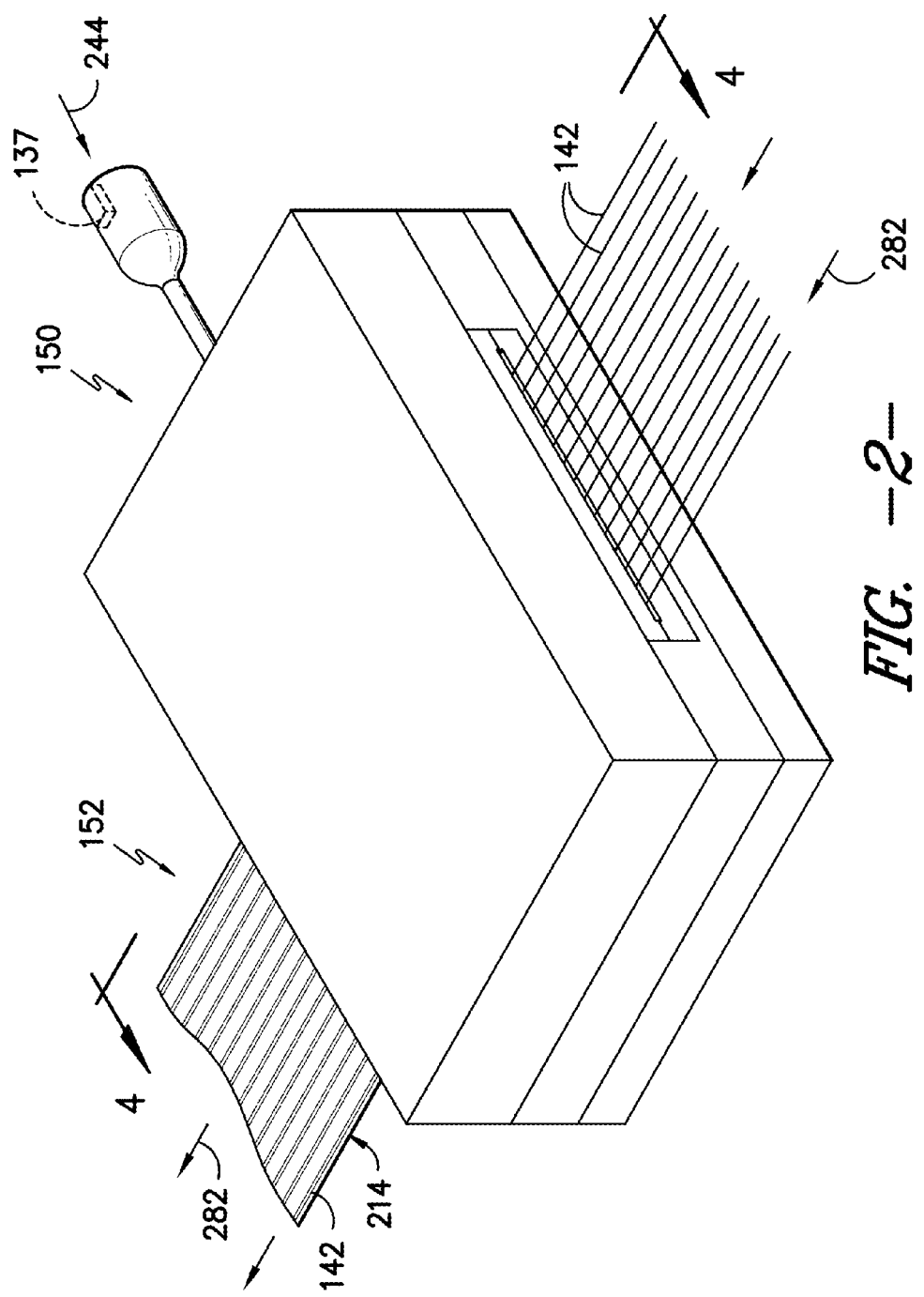
FIG. -2-

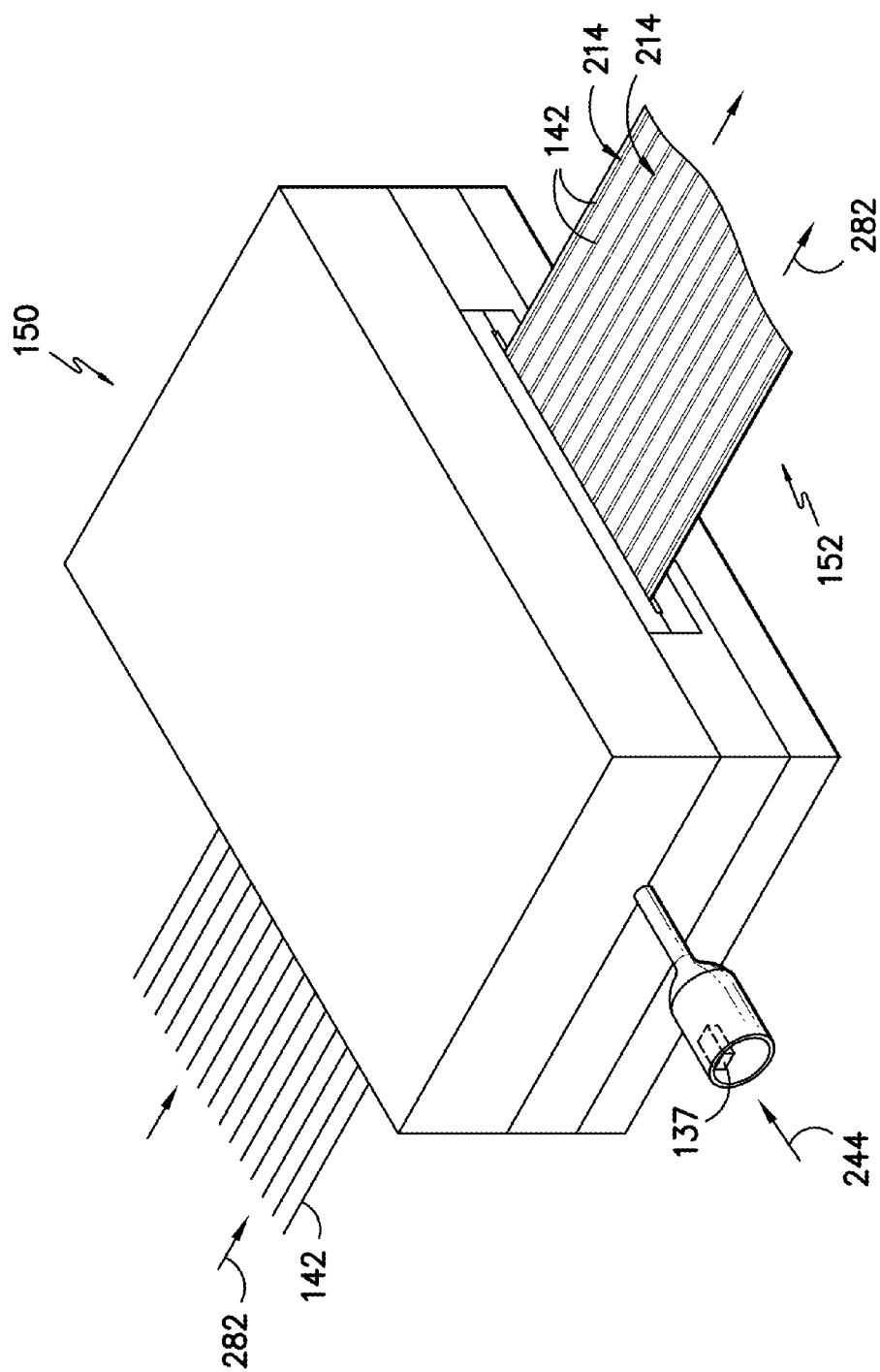
FIG. -3-

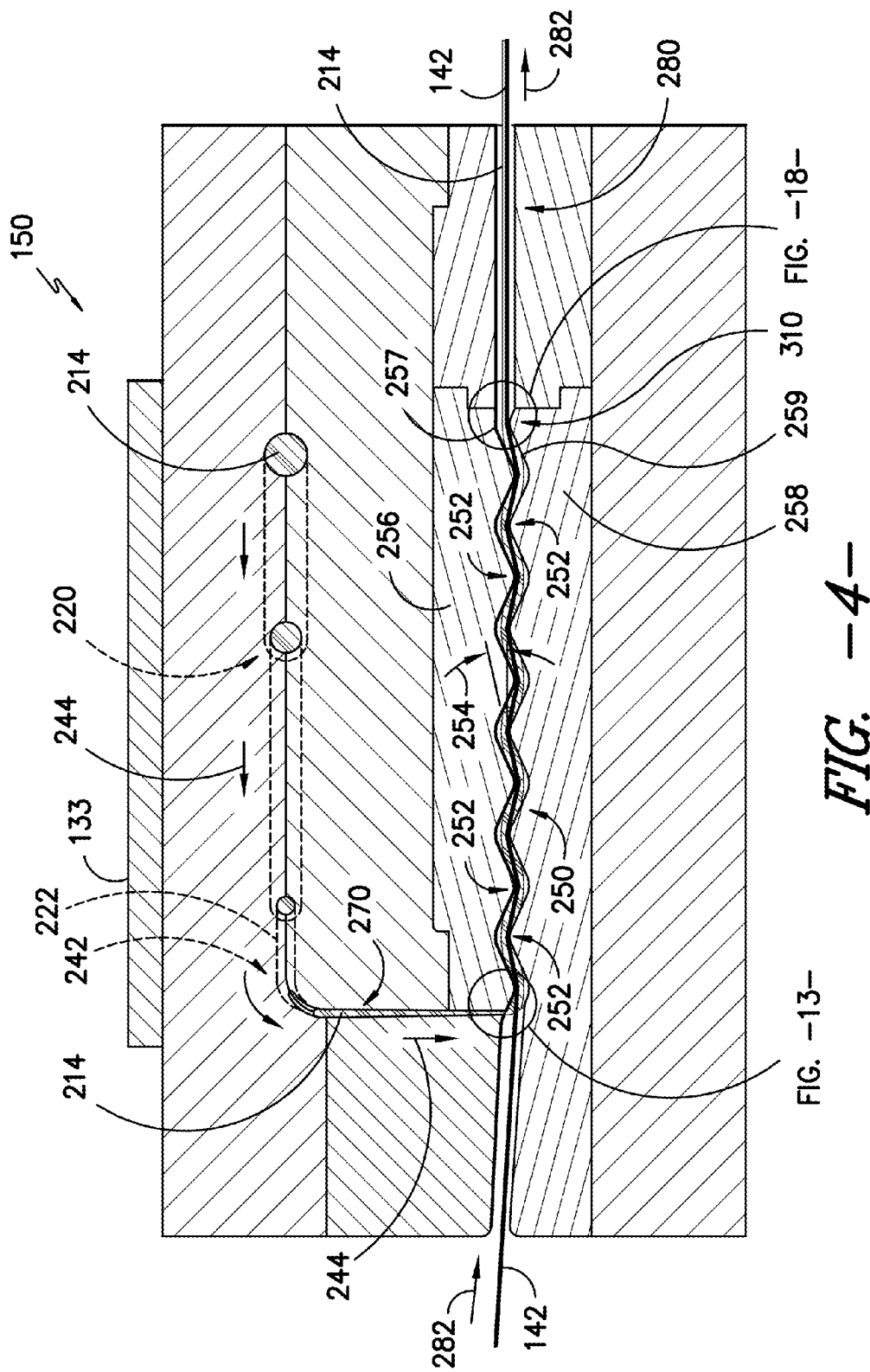

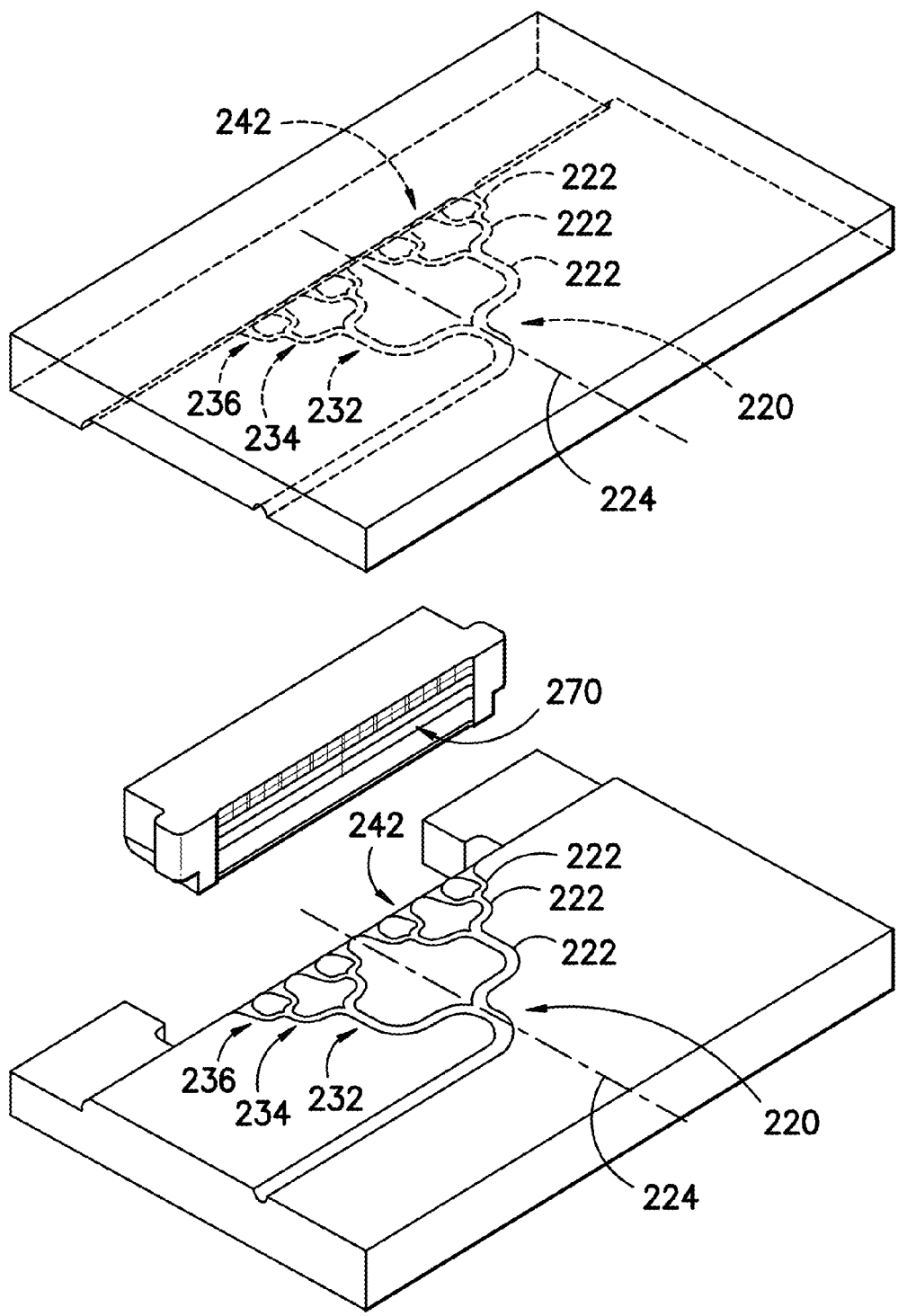
FIG. —5—

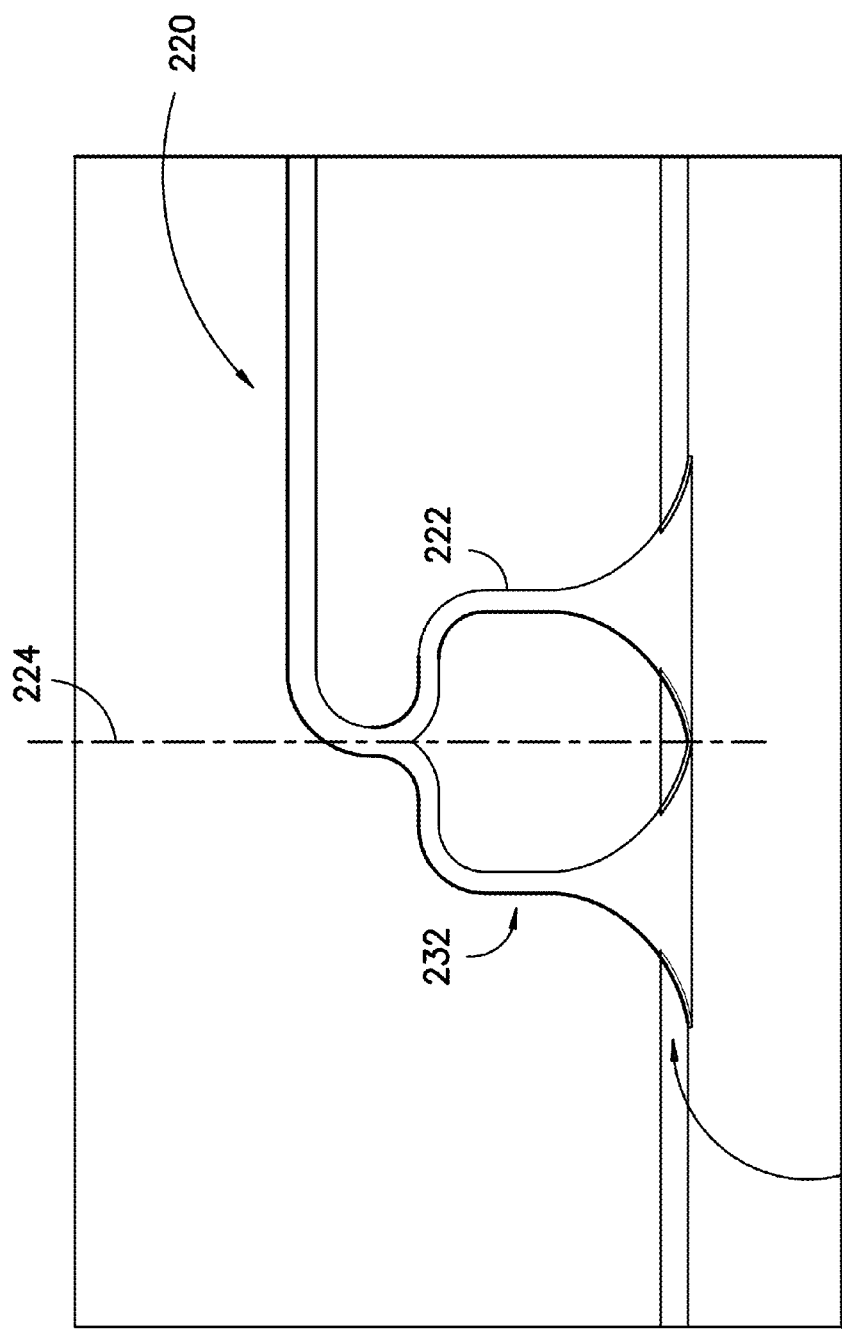
FIG. -6-

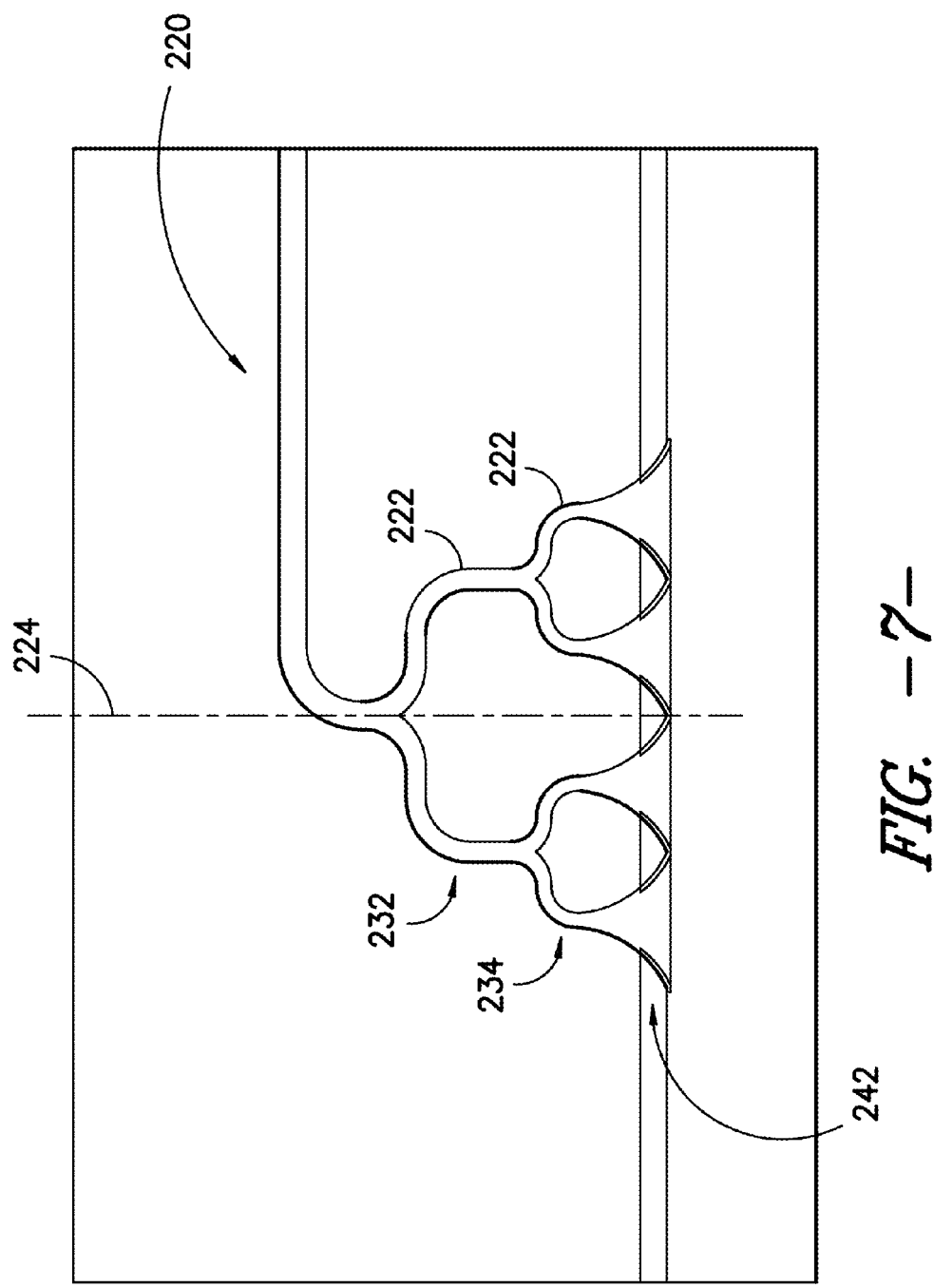
FIG. -7-

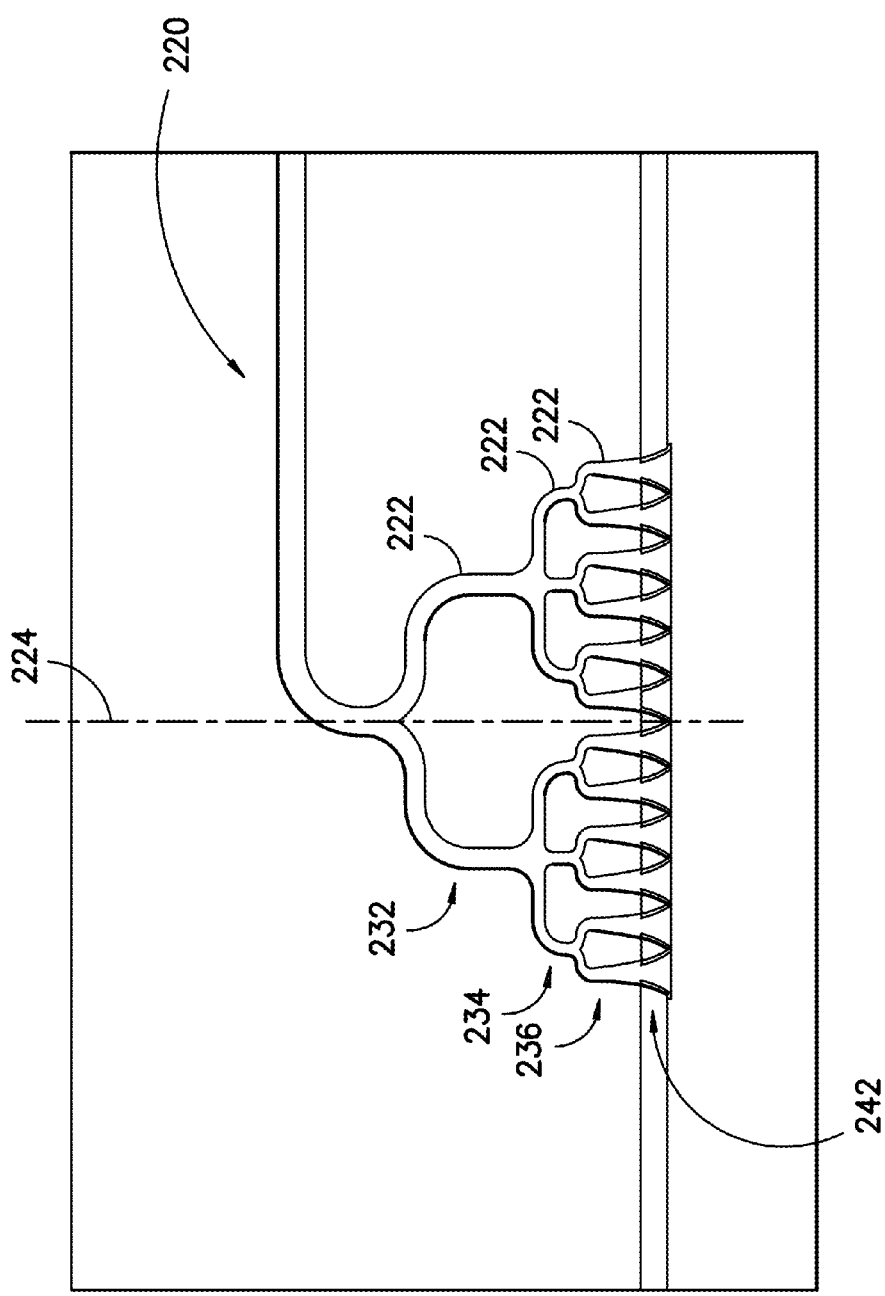
FIG. -8-

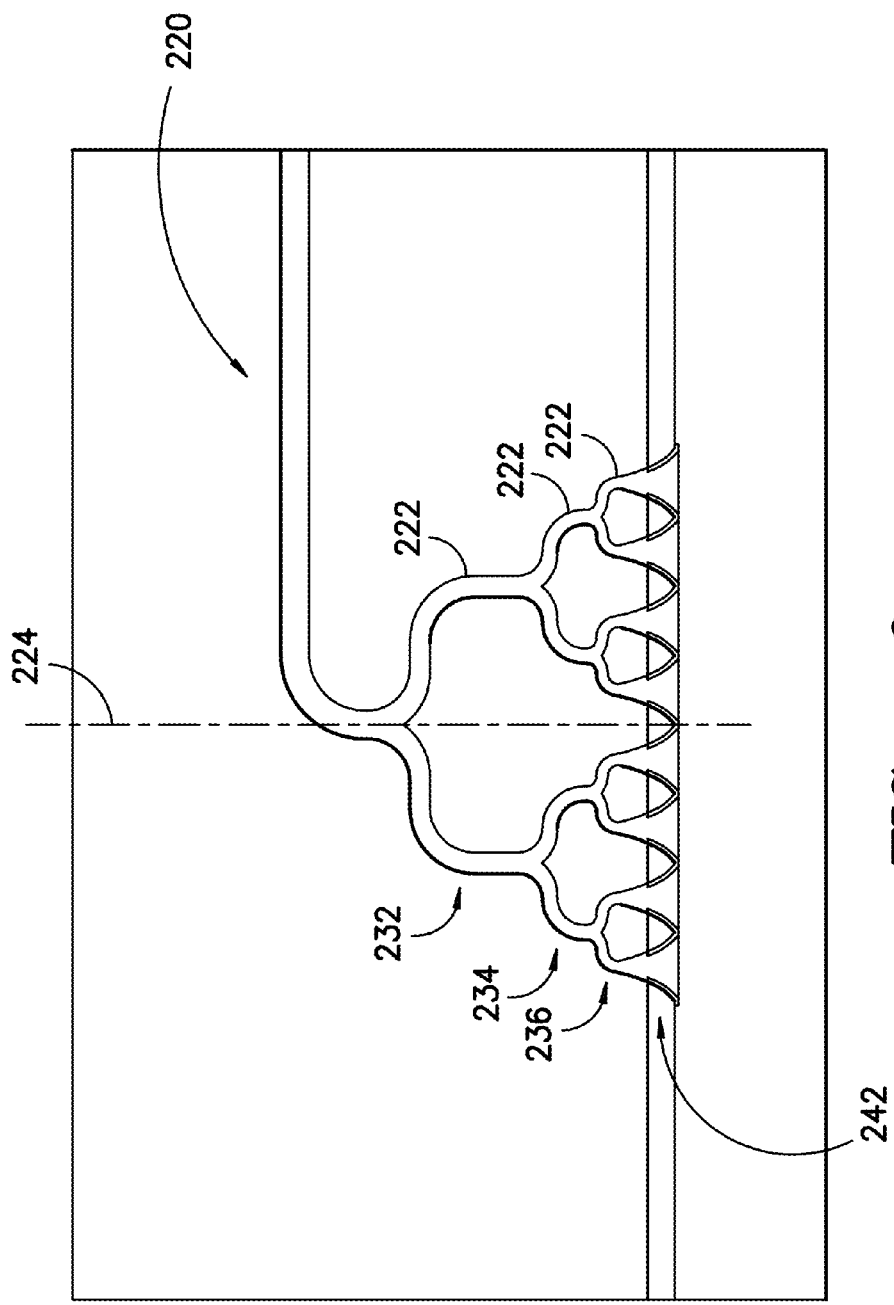
FIG. -9-

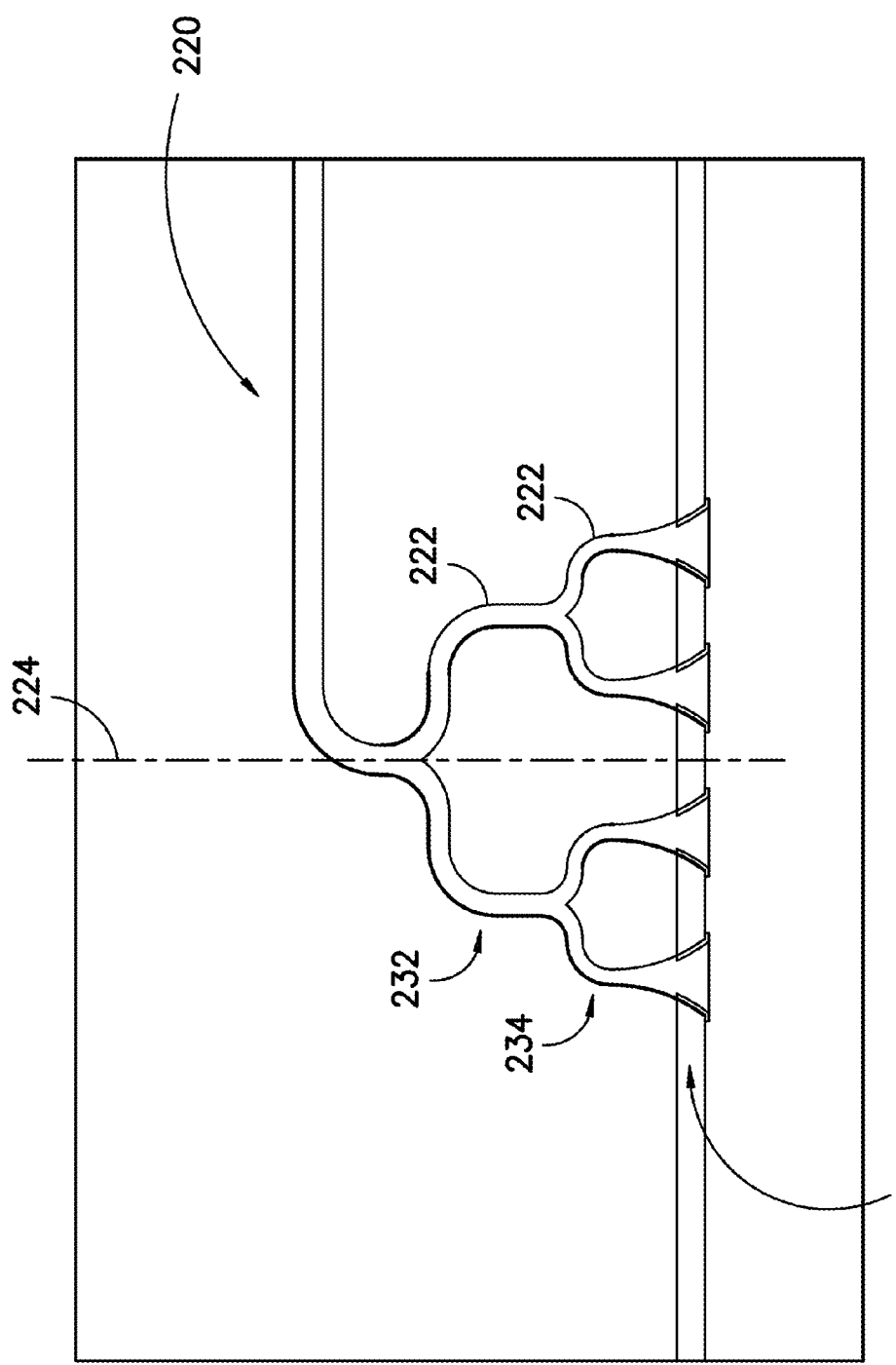
FIG. -10-

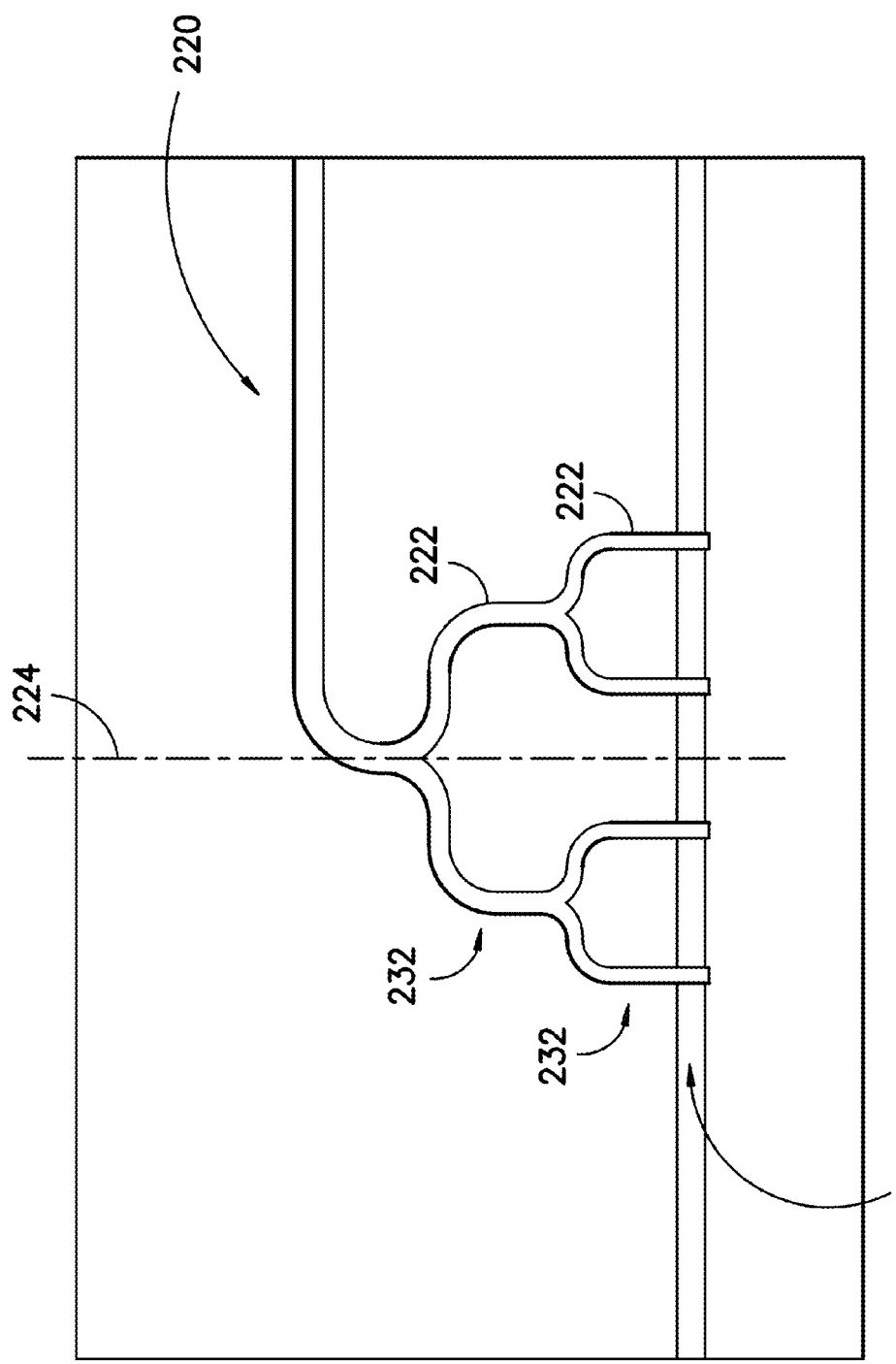
FIG. -11-

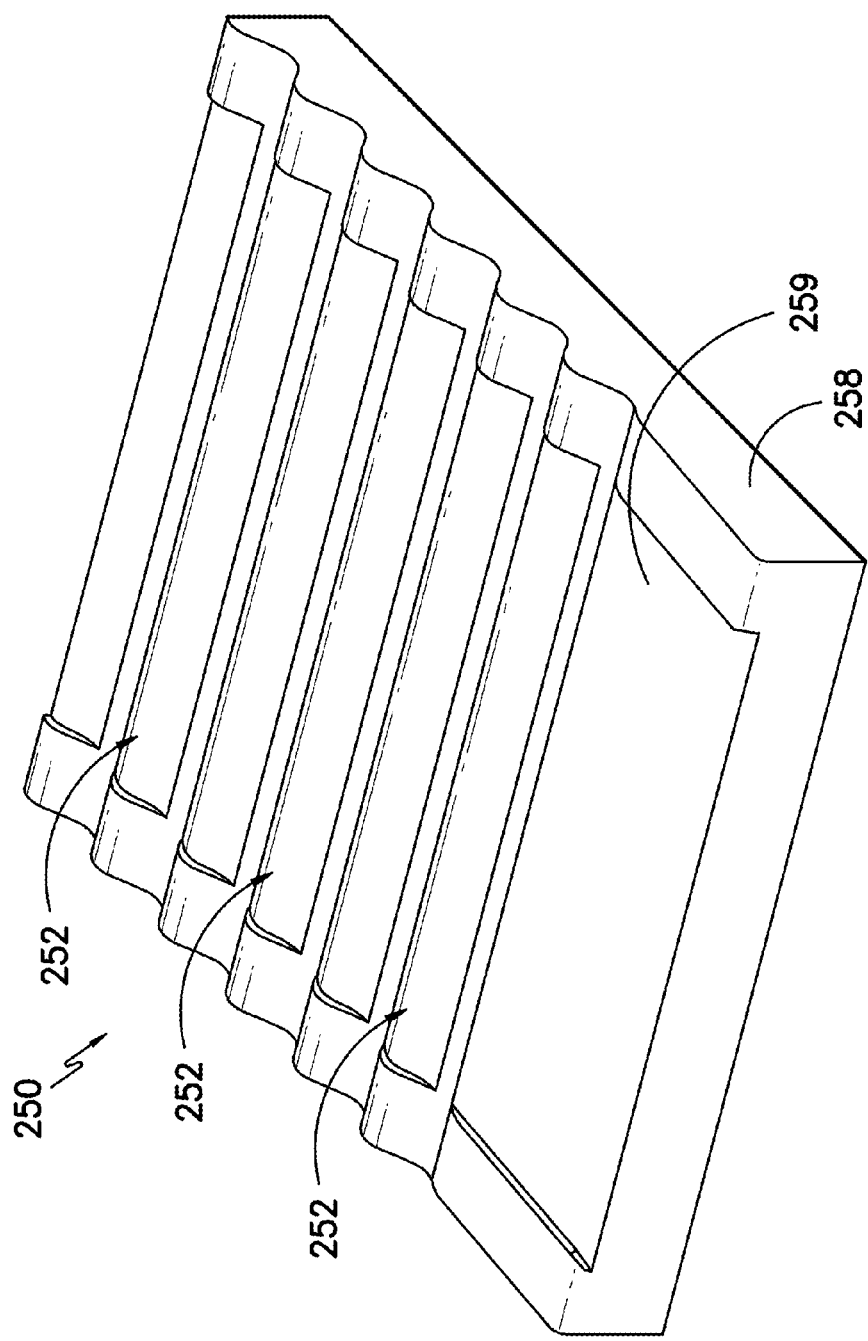
FIG. -12-

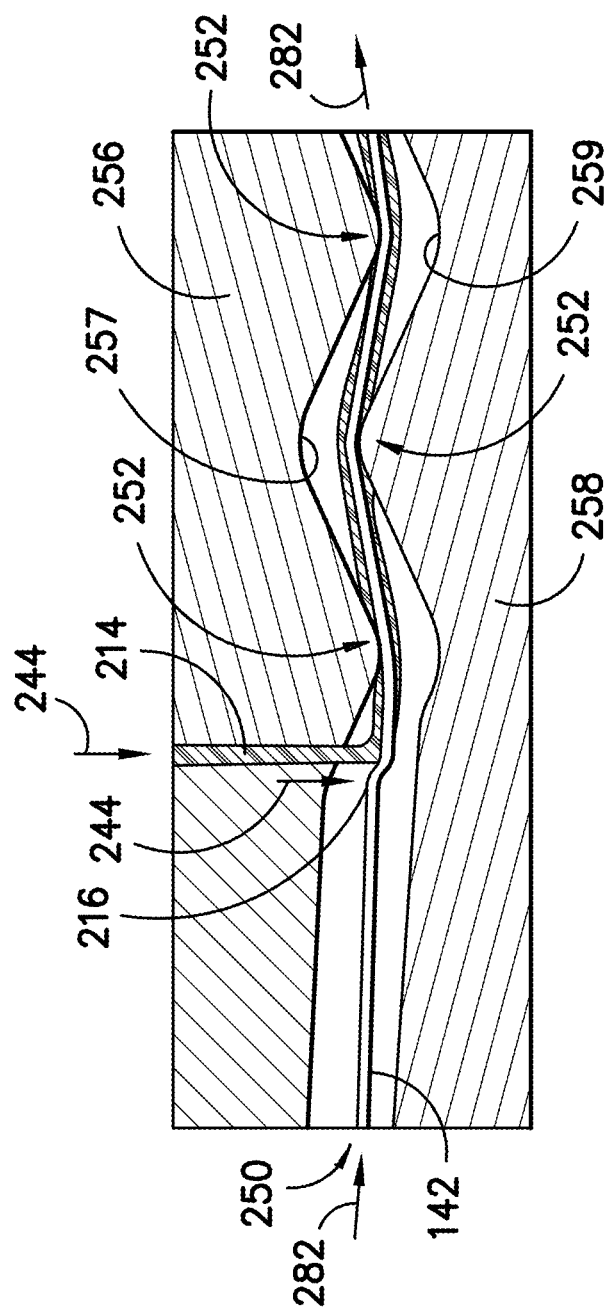

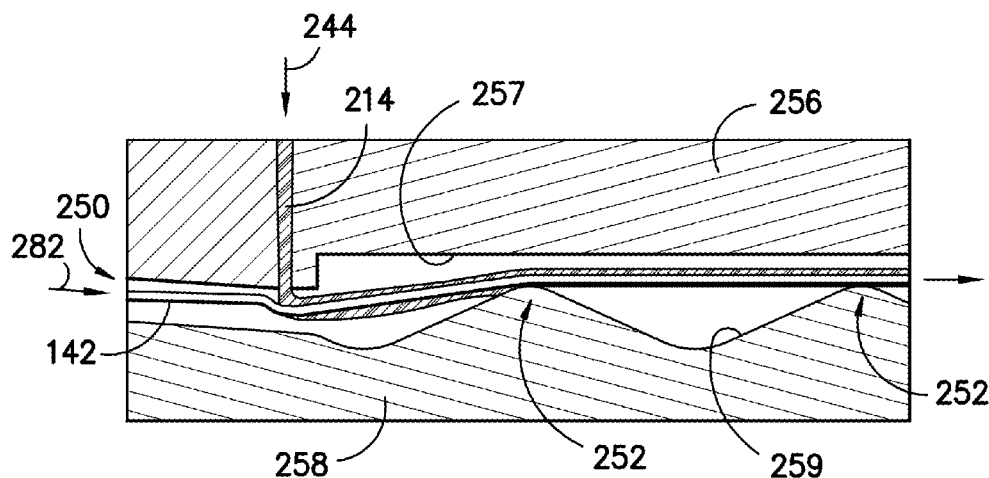
FIG. -14-
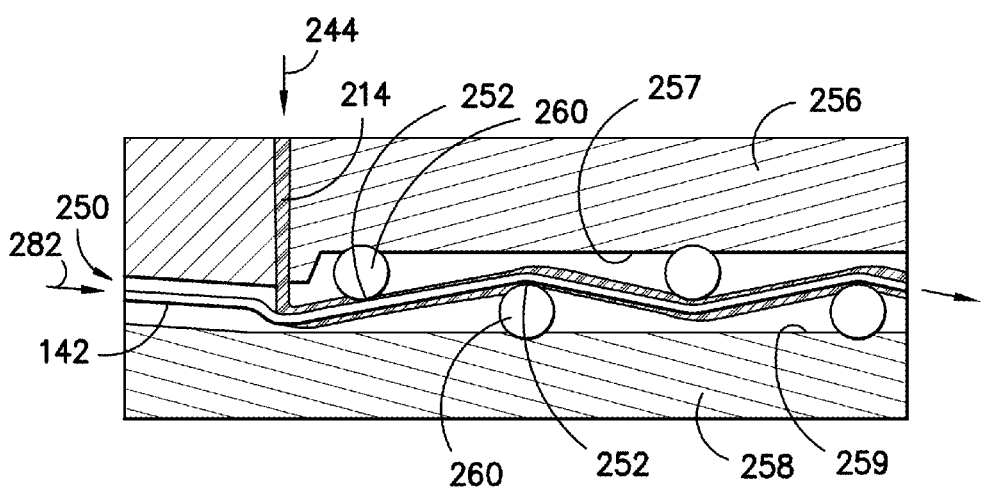
FIG. -15-

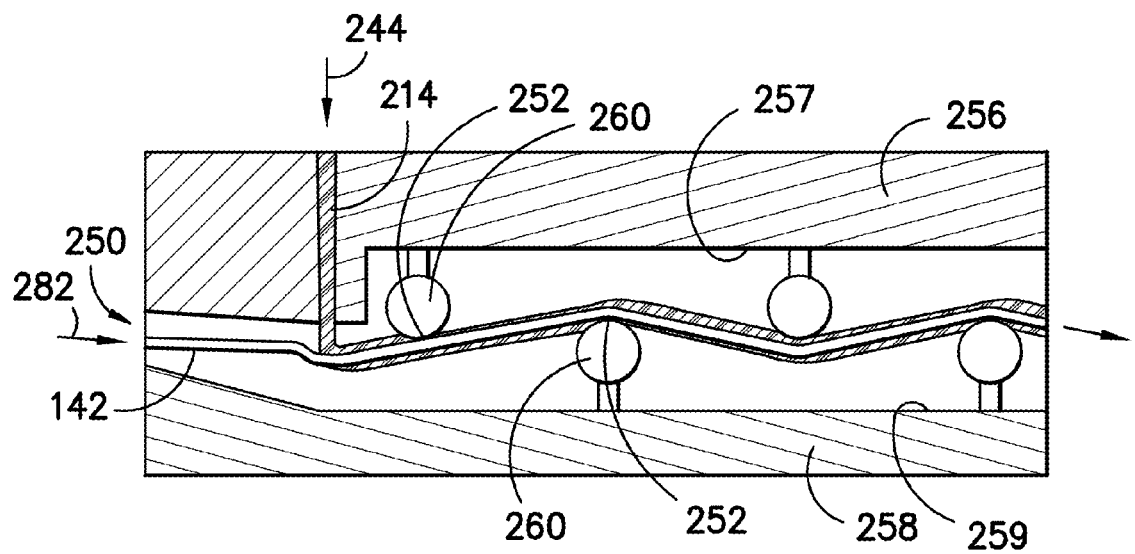
FIG. −16−
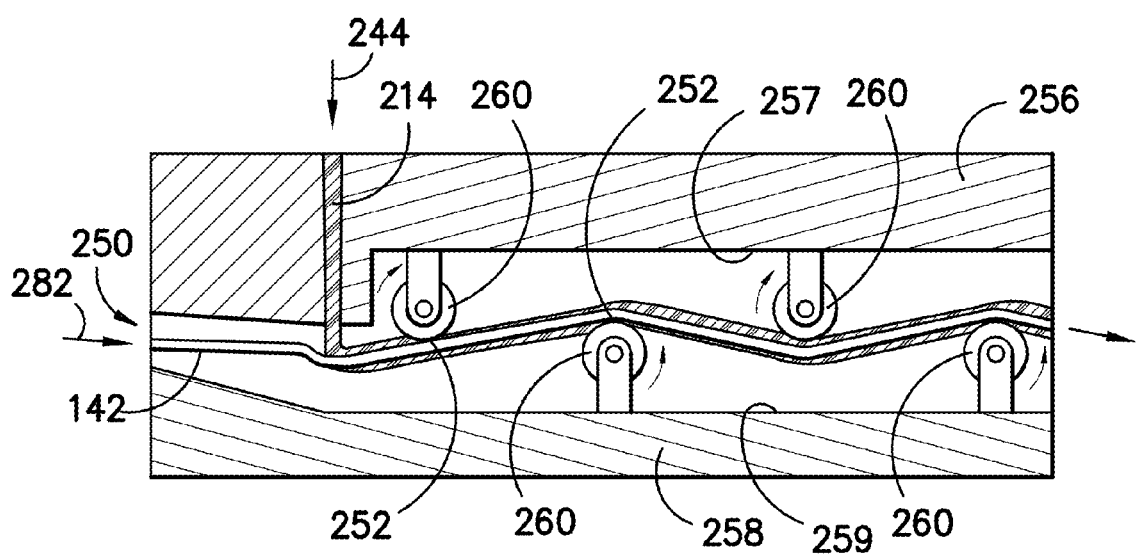
FIG. −17−

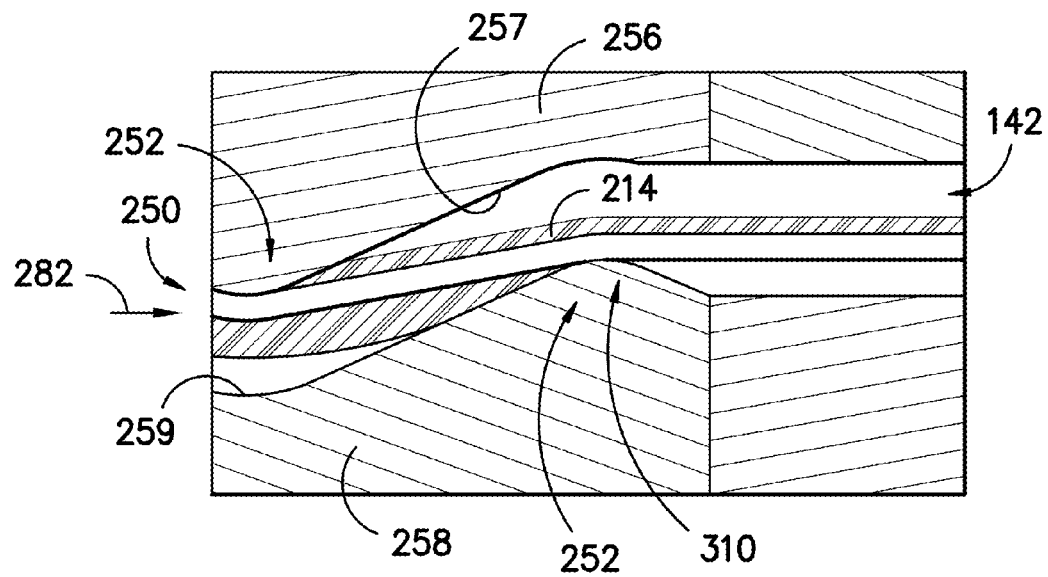
FIG. -18-
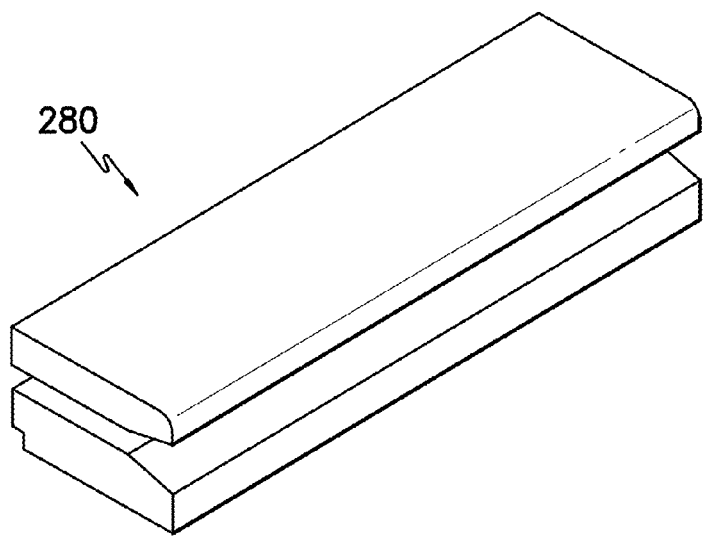
FIG. -19-

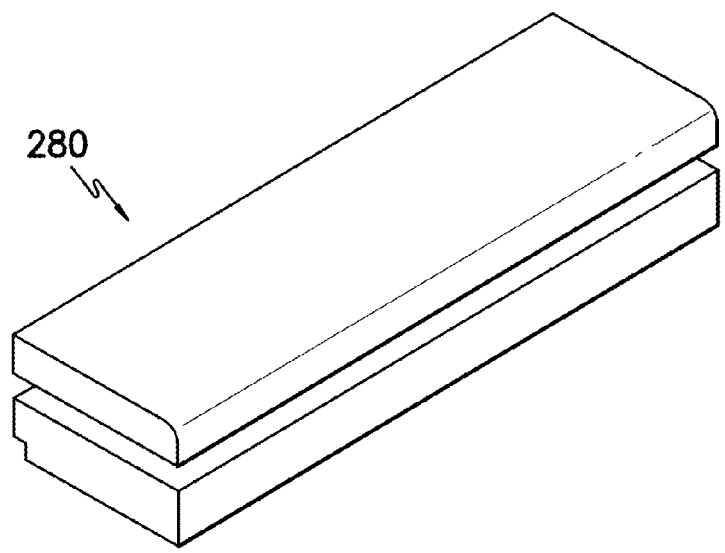
FIG. -20-
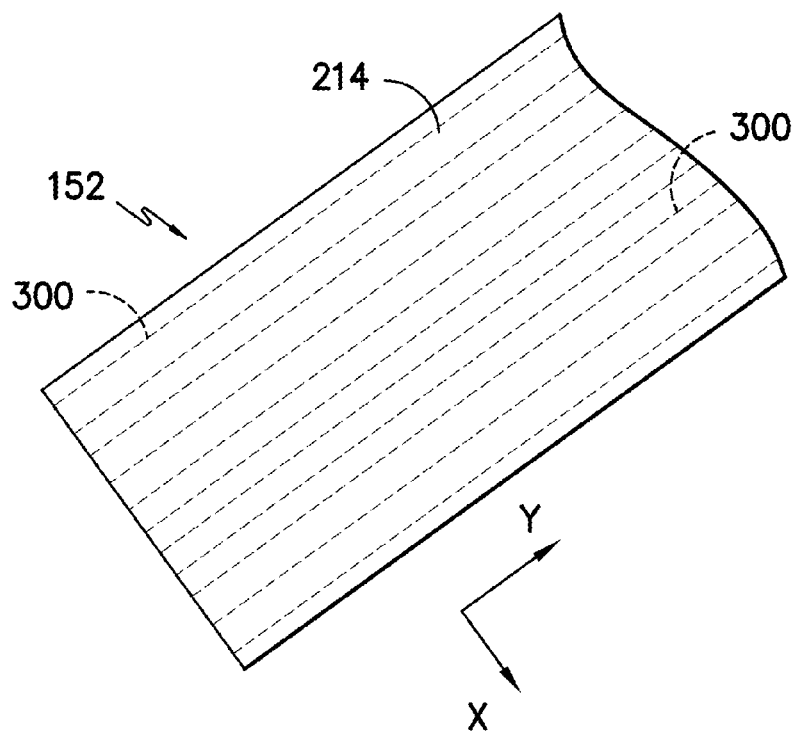
FIG. -21-

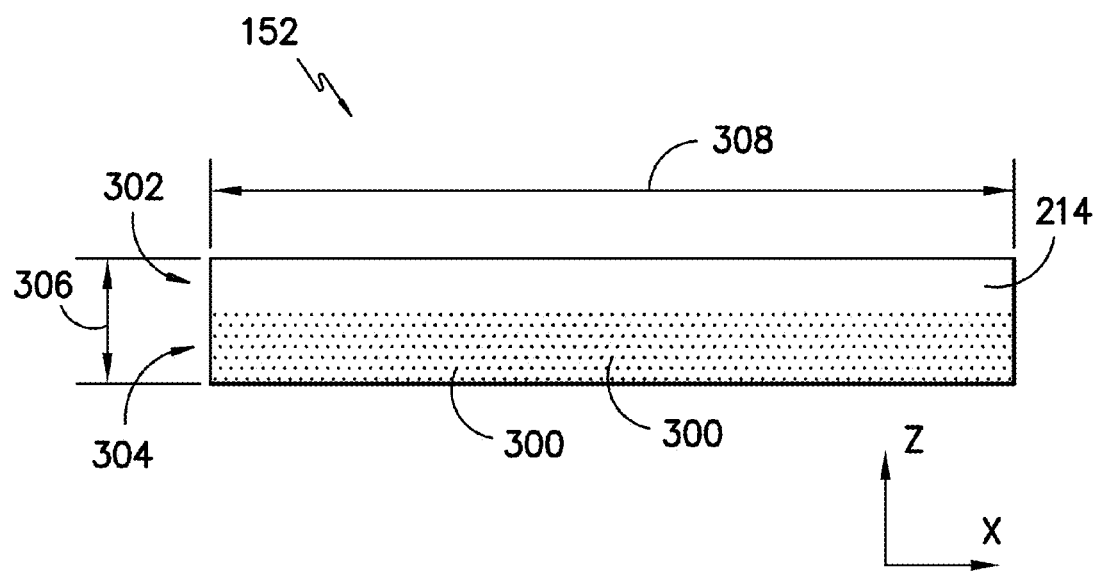
FIG. -22-
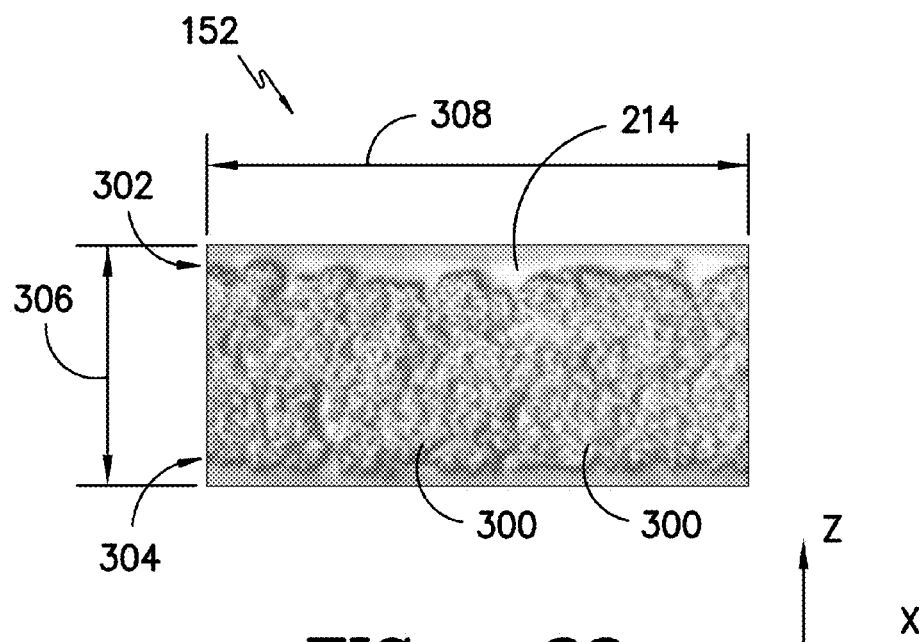
FIG. -23-

ASYMMETRIC FIBER REINFORCED POLYMER TAPE

This application relates to U.S. Provisional Patent Application Ser. No. 61/569,045, filed Dec. 9, 2011, titled: "SYSTEM AND METHOD FOR IMPREGNATING FIBER ROVINGS", and U.S. Provisional Patent Application Ser. No. 61/660,189, filed Jun. 15, 2012, titled: "ASYMMETRIC FIBER REINFORCED POLYMER TAPE", each of which is hereby incorporated by reference in its entirety.

BACKGROUND OF THE INVENTION

Fiber rovings have been employed in a wide variety of applications. For example, such rovings have been utilized to form fiber-reinforced composite rods. The rods may be utilized as lightweight structural reinforcements. For example, power umbilicals are often used in the transmission of fluids and/or electric signals between the sea surface and equipment located on the sea bed. To help strengthen such umbilicals, attempts have been made to use pultruded carbon fiber rods as separate load carrying elements.

Another application that is particularly suited for the use of fiber rovings is in the formation of profiles. Profiles are pultruded parts with a wide variety of cross-sectional shapes, and may be employed as a structural member for window lineals, decking planks, railings, balusters, roofing tiles, siding, trim boards, pipe, fencing, posts, light posts, highway signage, roadside marker posts, etc. Hollow profiles have been formed by pulling ("pultruding") continuous fiber rovings through a resin and then shaping the fiber-reinforced resin within a pultrusion die.

Further, fiber rovings may generally be utilized in any suitable applications to form, for example, suitable fiber reinforced plastics. As is generally known in the art, rovings utilized in these applications are typically combined with a polymer resin.

For many such applications, the fiber rovings are utilized to form fiber-reinforced tapes. The tapes may be further processed to form, for example, rods or pultruded parts as discussed above, or may themselves be utilized in a wide variety of applications. One such particularly useful application is in subsea piping, such as in the oil and gas industries, wherein the tapes are utilized to reinforce the pipe sections utilized in subsea applications.

There are many significant problems, however, with currently known rovings and the resulting applications that utilize such rovings. For example, many rovings rely upon thermoset resins (e.g., vinyl esters) to help achieve desired strength properties. Thermoset resins are difficult to use during manufacturing and do not possess good bonding characteristics for forming layers with other materials. Further, attempts have been made to utilize rovings with thermoplastic polymers in other types of applications. U.S. Patent Publication No. 2005/0186410 to Bryant, et al., for instance, describes attempts that were made to embed carbon fibers into a thermoplastic resin to form a composite core of an electrical transmission cable. Unfortunately, Bryant, et al. notes that these cores exhibited flaws and dry spots due to inadequate wetting of the fibers, which resulted in poor durability and strength. Another problem with such cores is that the thermoplastic resins could not operate at a high temperature.

Further, problems exist with presently known fiber reinforced tapes utilized in many applications, such as subsea applications. For example, tapes may be wrapped around existing products, such as pipe sections, to reinforce the pipe sections. However, presently known tapes may not adequately bond with such products to provide sufficient reinforcement.

As such, a need currently exists for an improved polymer reinforced fiber tape and method for forming a polymer reinforced polymer tape. Specifically, a need currently exists for tapes methods that provide improved bonding properties. Additionally, such tapes may provide the desired strength, durability, and temperature performance demanded by particular applications.

SUMMARY OF THE INVENTION

In accordance with one embodiment of the present disclosure, an asymmetric tape is disclosed. The asymmetric tape includes a polymer resin, and a plurality of fibers embedded in the polymer resin to form a fiber reinforced polymer material. The fiber reinforced polymer material includes a first surface and an opposing second surface. The fibers are disposed in the fiber reinforced polymer material to form a resin rich portion and a fiber rich portion. The resin rich portion includes the first surface and the fiber rich portion includes the second surface.

In accordance with another embodiment of the present disclosure, a system for impregnating at least one fiber roving with a polymer resin to form an asymmetric tape is disclosed. The system includes a die including an impregnation section. The impregnation section includes an impregnation zone configured to impregnate the roving with the resin. The impregnation zone comprising a plurality of contact surfaces. A tape exits the die, the tape including the impregnated roving and having a resin rich portion and a fiber rich portion.

In accordance with another embodiment of the present disclosure, a method for impregnating at least one fiber roving with a polymer resin to form an asymmetric tape is disclosed. The method includes flowing a polymer resin through a manifold assembly of a die. The manifold assembly includes a plurality of branched runners. The method further includes coating at least one fiber roving with the resin, and traversing the coated roving through an impregnation zone of the die to impregnate the roving with the resin. A tape exits the die, the tape including the impregnated roving and having a resin rich portion and a fiber rich portion.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a schematic illustration of one embodiment of an impregnation system for use in the present disclosure;

FIG. 2 is a perspective view of one embodiment of a die for use in the present disclosure;

FIG. 3 is an opposing perspective view of one embodiment of a die for use in the present disclosure;

FIG. 4 is a cross-sectional view of the die shown in FIG. 2;

FIG. 5 is an exploded view of one embodiment of a manifold assembly and gate passage for a die that may be employed in the present disclosure;

FIG. 6 is a plan view of one embodiment of a manifold assembly that may be employed in the present disclosure;

FIG. 7 is a plan view of another embodiment of a manifold assembly that may be employed in the present disclosure;

FIG. 8 is a plan view of another embodiment of a manifold assembly that may be employed in the present disclosure;

FIG. 9 is a plan view of another embodiment of a manifold assembly that may be employed in the present disclosure;

FIG. 10 is a plan view of another embodiment of a manifold assembly that may be employed in the present disclosure;

FIG. 11 is a plan view of another embodiment of a manifold assembly that may be employed in the present disclosure;

FIG. 12 is a perspective view of one embodiment of a second impregnation plate at least partially defining an impregnation zone that may be employed in the present disclosure;

FIG. 13 is a close-up cross-sectional view, as indicated in FIG. 4, of one embodiment of a portion of an impregnation zone that may be employed in the present disclosure;

FIG. 14 is a close-up cross-sectional view of another embodiment of a portion of an impregnation zone that may be employed in the present disclosure;

FIG. 15 is a close-up cross-sectional view of another embodiment of a portion of an impregnation zone that may be employed in the present disclosure;

FIG. 16 is a close-up cross-sectional view of another embodiment of a portion of an impregnation zone that may be employed in the present disclosure;

FIG. 17 is a close-up cross-sectional view of another embodiment of a portion of an impregnation zone that may be employed in the present disclosure;

FIG. 18 is a close-up cross-sectional view, as indicated in FIG. 4, of one embodiment of a downstream end portion of an impregnation zone that may be employed in the present disclosure;

FIG. 19 is a perspective view of one embodiment of a land zone that may be employed in the present disclosure;

FIG. 20 is a perspective view of another embodiment of a land zone that may be employed in the present disclosure;

FIG. 21 is a perspective view of one embodiment of a tape for use in the present disclosure;

FIG. 22 is a cross-sectional view of another embodiment of a tape for use in the present disclosure; and FIG. 23 is a cross-sectional microscopy image of another embodiment of a tape for use in the present disclosure.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present disclosure is directed to fiber reinforced polymer tapes and methods for forming the fiber reinforced polymer tapes. In particular, fiber reinforced tapes formed according to the present disclosure advantageously include a resin rich portion and a fiber rich portion. The resin rich portion includes one surface of the tape, and the fiber rich portion includes the other opposing surface of the tape, such that the tape is generally asymmetric. The resin rich portion may advantageously facilitate improved bonding of the tape with other components, such as pipes, etc., for use in various applications. Because this portion is resin rich, the resin may be relatively more efficiently heated to a temperature that allows consolidation and bonding with another component, which provides more rapid and thorough bonding thereof. Better bonding generally provides improved strength, etc., for the resulting component. The fiber rich portion may advantageously strengthen and reinforce the tape. This further provides improved strength, etc., for resulting components to which the tape may be bonded.

A tape according to the present disclosure may be formed using any suitable process or apparatus. Exemplary embodiments of suitable processes and apparatus for forming a tape, as well as exemplary tapes, according to the present disclosure are discussed in detail below.

The present disclosure is further directed to a die and method for impregnating fiber rovings with a polymer resin, which may thus form a fiber reinforced polymer tape. The impregnated fiber rovings, and resulting tape, may be utilized in composite rods, profiles, or any other suitable fiber reinforced plastic applications. The die according to the present invention generally includes a manifold assembly, an impregnation zone at least partially defined in an impregnation section, and a gate passage therebetween. The manifold assembly distributes a polymer resin therethrough. Upon exiting the manifold assembly, the resin flows into and through the gate passage. The rovings are traversed through the die such that the resin, upon exiting the gate passage, coats the rovings. After being coated with the resin, the rovings are traversed through the impregnation zone and impregnated therein with the resin.

According to further aspects of the present invention, an extrusion device may be employed in conjunction with the die to impregnate the rovings with the polymer. Among other things, the extrusion device further facilitates the ability of the polymer to be applied to the entire surface of the fibers, as discussed below.

Referring to FIG. 1, one embodiment of such an extrusion device is shown. More particularly, the apparatus includes an extruder 120 containing a screw shaft 124 mounted inside a barrel 122. A heater 130 (e.g., electrical resistance heater) is mounted outside the barrel 122. During use, a polymer feedstock 127 is supplied to the extruder 120 through a hopper 126. The feedstock 127 is conveyed inside the barrel 122 by the screw shaft 124 and heated by frictional forces inside the barrel 122 and by the heater 130. Upon being heated, the feedstock 127 exits the barrel 122 through a barrel flange 128 and enters a die flange 132 of an impregnation die 150.

A continuous fiber roving 142 or a plurality of continuous fiber rovings 142 are supplied from a reel or reels 144 to die 150. The ravings 142 are generally positioned side-by-side, with minimal to no distance between neighboring rovings, before impregnation. The feedstock 127 may further be heated inside the die by heaters 133 mounted in or around the die 150. The die is generally operated at temperatures that are sufficient to cause and/or maintain the proper melt temperature for the polymer, thus allowing for the desired level of impregnation of the rovings by the polymer. Typically, the operation temperature of the die is higher than the melt temperature of the polymer, such as at temperatures from about 200° C. to about 450° C. When processed in this manner, the continuous fiber ravings 142 become embedded in the polymer matrix, which may be a resin 214 processed from the feedstock 127.

The mixture may then exit the impregnation die 150 as wetted composite or extrudate 152.

As used herein, the term "roving" generally refers to a bundle of individual fibers 300. The fibers 300 contained within the roving can be twisted or can be straight. The rovings may contain a single fiber type or different types of fibers 300. Different fibers may also be contained in individual rovings or, alternatively, each roving may contain a different fiber type. The continuous fibers employed in the rovings possess a high degree of tensile strength relative to their mass. For example, the ultimate tensile strength of the fibers is typically from about 1,000 to about 15,000 Megapascals ("MPa"), in some embodiments from about 2,000 MPa to about 10,000 MPa, and in some embodiments, from about 3,000 MPa to about 6,000 MPa. Such tensile strengths may be achieved even though the fibers are of a relatively light weight, such as a mass per unit length of from about 0.05 to about 2 grams per meter, in some embodiments from about 0.4 to about 1.5 grams per meter. The ratio of tensile strength to mass per unit length may thus be about 1,000 Megapascals per gram per meter ("MPa/g/m") or greater, in some embodiments about 4,000 MPa/g/m or greater, and in some embodiments, from about 5,500 to about 20,000 MPa/g/m. Such high strength fibers may, for instance, be metal fibers, glass fibers (e.g., E-glass, A-glass, C-glass, D-glass, AR-glass, R-glass, S-glass such as S1-glass or S2-glass, etc.), carbon fibers (e.g., amorphous carbon, graphitic carbon, or metal-coated carbon, etc.), boron fibers, ceramic fibers (e.g., alumina or silica), aramid fibers (e.g., Kevlar® marketed by E.I. duPont de Nemours, Wilmington, Del.), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic and/or thermoset compositions. Carbon fibers are particularly suitable for use as the continuous fibers, which typically have a tensile strength to mass ratio in the range of from about 5,000 to about 7,000 MPa/g/m. The continuous fibers often have a nominal diameter of about 4 to about 35 micrometers, and in some embodiments, from about 9 to about 35 micrometers. The number of fibers contained in each roving can be constant or vary from roving to roving. Typically, a roving contains from about 1,000 fibers to about 50,000 individual fibers, and in some embodiments, from about 5,000 to about 30,000 fibers.

Any of a variety of thermoplastic or thermoset polymers may be employed to form the polymer matrix in which the continuous fibers are embedded. For example, suitable thermoplastic polymers for use in the present invention may include, for instance, polyolefins (e.g., polypropylene, propylene-ethylene copolymers, etc.), polyesters (e.g., polybutylene terephalate ("PBT")), polycarbonates, polyamides (e.g., PA12, Nylon™), polyether ketones (e.g., polyether ether ketone ("PEEK")), polyetherimides, polyarylene ketones (e.g., polyphenylene diketone ("PPDK")), liquid crystal polymers, polyarylene sulfides (e.g., polyphenylene sulfide ("PPS"), poly(biphenylene sulfide ketone), poly(phenylene sulfide diketone), poly(biphenylene sulfide), etc.), fluoropolymers (e.g., polytetrafluoroethylene-perfluoromethylvinylether polymer, perfluoro-alkoxyalkane polymer, petrafluoroethylene polymer, ethylene-tetrafluoroethylene polymer, etc.), polyacetals, polyurethanes, polycarbonates, styrenic polymers (e.g., acrylonitrile butadiene styrene ("ABS")), and so forth.

The properties of the polymer matrix are generally selected to achieve the desired combination of processability and performance. For example, the melt viscosity of the polymer matrix is generally low enough so that the polymer can adequately impregnate the fibers. In this regard, the melt viscosity typically ranges from about 25 to about 5,000 Pascal-seconds ("Pa-s"), in some embodiments from about 25 to about 1,000 Pa-s, in some embodiments from 50 about 500 Pa-s, and in some embodiments, from about 60 to about 200 Pa-s, determined at the operating conditions used for the polymer (e.g., about 360° C.). Likewise, when the impregnated rovings are intended for applications involving high temperatures, a polymer is employed that has a relatively high melting temperature, For example, the melting temperature of such high temperature polymers may range from about 200° C. to about 500° C., in some embodiments from about 225° C. to about 400° C., and in some embodiments, from about 250° C. to about 350° C.

A pressure sensor 137 (FIGS. 2 and 3) may sense the pressure near the impregnation die 150 to allow control to be exerted over the rate of extrusion by controlling the rotational speed of the screw shaft 124, or the feed rate of the feeder. That is, the pressure sensor 137 is positioned near the impregnation die 150, such as upstream of the manifold assembly 220, so that the extruder 120 can be operated to deliver a correct amount of resin 214 for interaction with the fiber rovings 142. After leaving the impregnation die 150, the extrudate or tape 152, which may comprises the fiber impregnated polymer material, may enter an optional pre-shaping or guiding section (not shown) and/or a preheating device to control the temperature of the extrudate before entering a nip formed between two adjacent rollers 190. Although optional, the rollers 190 can help to consolidate the tape 152 into a final tape form, as well as enhance fiber impregnation and squeeze out any excess voids. In addition to the rollers 190, other shaping devices may also be employed, such as a die system. Regardless, the resulting consolidated tape 156 is pulled by tracks 162 and 164 mounted on rollers. The tracks 162 and 164 also pull the tape 152 from the impregnation die 150 and through the rollers 190. If desired, the consolidated tape 156 may be wound up at a section 171. Generally speaking, the resulting tapes are relatively thin and typically have a thickness of from about 0.05 to about 1 millimeter, in some embodiments from about 0.1 to about 0.8 millimeters, in some embodiments from about 0.1 to about 0.4 millimeters, and in some embodiments, from about 0.2 to about 0.4 millimeters.

Perspective views of one embodiment of a die 150 according to the present disclosure are further shown in FIGS. 2 and 3. As shown, resin 214 is flowed into the die 150 as indicated by resin flow direction 244. The resin 214 is distributed within the die 150 and then interacted with the ravings 142. The rovings 142 are traversed through the die 150 in roving run direction 282, and are coated with resin 214. The ravings 142 are then impregnated with the resin 214, and these impregnated rovings 142 exit the die 150 as tape 152.

Within the impregnation die, it is generally desired that the rovings 142 are traversed through an impregnation zone 250 to impregnate the rovings with the polymer resin 214. In the impregnation zone 250, the polymer resin may be forced generally transversely through the rovings by shear and pressure created in the impregnation zone 250, which significantly enhances the degree of impregnation. This is particularly useful when forming a composite from tapes of a high fiber content, such as about 35% weight fraction ("Wf") or more, and in some embodiments, from about 40% Wf or more. Typically, the die 150 will include a plurality of contact surfaces 252, such as for example at least 2, at least 3, from 4 to 7, from 2 to 20, from 2 to 30, from 2 to 40, from 2 to 50, or more contact surfaces 252, to create a sufficient degree of penetration and pressure on the rovings 142. Although their particular form may vary, the contact surfaces 252 typically possess a curvilinear surface, such as a curved lobe, pin, etc. The contact surfaces 252 are also typically made of a metal material.

FIG. 4 shows a cross-sectional view of an impregnation die 150, As shown, the impregnation die 150 includes a manifold assembly 220 and an impregnation section. The impregnation section includes an impregnation zone 250. In some embodiments, the impregnation section additionally includes a gate passage 270. The manifold assembly 220 is provided for flowing the polymer resin 214 therethrough. For example, the manifold assembly 220 may include a channel 222 or a plurality of channels 222. The resin 214 provided to the impregnation die 150 may flow through the channels 222.

As shown in FIGS. 5 through 11, in exemplary embodiments, at least a portion of each of the channels 222 may be curvilinear. The curvilinear portions may allow for relatively smooth redirection of the resin 214 in various directions to distribute the resin 214 through the manifold assembly 220, and may allow for relatively smooth flow of the resin 214 through the channels 222, Alternatively, the channels 222 may be linear, and redirection of the resin 214 may be through relatively sharp transition areas between linear portions of the channels 222. It should further be understood that the channels 222 may have any suitable shape, size, and/or contour.

The plurality of channels 222 may, in exemplary embodiments as shown in FIGS. 5 through 11, be a plurality of branched runners 222. The runners 222 may include a first branched runner group 232. The first branched runner group 232 includes a plurality of runners 222 branching off from an initial channel or channels 222 that provide the resin 214 to the manifold assembly 220. The first branched runner group 232 may include 2, 3, 4 or more runners 222 branching off from the initial channels 222.

If desired, the runners 222 may include a second branched runner group 234 diverging from the first branched runner group 232, as shown in FIGS. 5 and 7 through 11. For example, a plurality of runners 222 from the second branched runner group 234 may branch off from one or more of the runners 222 in the first branched runner group 232. The second branched runner group 234 may include 2, 3, 4 or more runners 222 branching off from runners 222 in the first branched runner group 232.

If desired, the runners 222 may include a third branched runner group 236 diverging from the second branched runner group 234, as shown in FIGS. 5 and 8 through 9. For example, a plurality of runners 222 from the third branched runner group 236 may branch off from one or more of the runners 222 in the second branched runner group 234. The third branched runner group 236 may include 2, 3, 4 or more runners 222 branching off from runners 222 in the second branched runner group 234.

In some exemplary embodiments, as shown in FIGS. 5 through 11, the plurality of branched runners 222 have a symmetrical orientation along a central axis 224. The branched runners 222 and the symmetrical orientation thereof generally evenly distribute the resin 214, such that the flow of resin 214 exiting the manifold assembly 220 and coating the rovings 142 is substantially uniformly distributed on the ravings 142. This desirably allows for generally uniform impregnation of the rovings 142.

Further, the manifold assembly 220 may in some embodiments define an outlet region 242. The outlet region 242 is that portion of the manifold assembly 220 wherein resin 214 exits the manifold assembly 220. Thus, the outlet region 242 generally encompasses at least a downstream portion of the channels or runners 222 from which the resin 214 exits. In some embodiments, as shown in FIGS. 5 through 10, at least a portion of the channels or runners 222 disposed in the outlet region 242 have an increasing area in a flow direction 244 of the resin 214. The increasing area allows for diffusion and further distribution of the resin 214 as the resin 214 flows through the manifold assembly 220, which further allows for substantially uniform distribution of the resin 214 on the rovings 142. Additionally or alternatively, various channels or runners 222 disposed in the outlet region 242 may have constant areas in the flow direction 244 of the resin 214, as shown in FIG. 11, or may have decreasing areas in the flow direction 244 of the resin 214.

In some embodiments, as shown in FIGS. 5 through 9, each of the channels or runners 222 disposed in the outlet region 242 is positioned such that resin 214 flowing therefrom is combined with resin 214 from other channels or runners 222 disposed in the outlet region 242. This combination of the resin 214 from the various channels or runners 222 disposed in the outlet region 242 produces a generally singular and uniformly distributed flow of resin 214 from the manifold assembly 220 to substantially uniformly coat the rovings 142. Alternatively, as shown in FIGS. 10 and 11, various of the channels or runners 222 disposed in the outlet region 242 may be positioned such that resin 214 flowing therefrom is discrete from the resin 214 from other channels or runners 222 disposed in the outlet region 242. In these embodiments, a plurality of discrete but generally evenly distributed resin flows 214 may be produced by the manifold assembly 220 for substantially uniformly coating the rovings 142.

As shown in FIG. 4, at least a portion of the channels or runners 222 disposed in the outlet region 242 have curvilinear cross-sectional profiles. These curvilinear profiles allow for the resin 214 to be gradually directed from the channels or runners 222 generally downward towards the rovings 142. Alternatively, however, these channels or runners 222 may have any suitable cross-sectional profiles.

As further illustrated in FIGS. 4 and 5, after flowing through the manifold assembly 220, the resin 214 may flow through gate passage 270. Gate passage 270 is positioned between the manifold assembly 220 and the impregnation zone 250, and is provided for flowing the resin 214 from the manifold assembly 220 such that the resin 214 coats the rovings 142. Thus, resin 214 exiting the manifold assembly 220, such as through outlet region 242, may enter gate passage 270 and flow therethrough.

In some embodiments, as shown in FIG. 4, the gate passage 270 extends vertically between the manifold assembly 220 and the impregnation zone 250. Alternatively, however, the gate passage 270 may extend at any suitable angle between vertical and horizontal such that resin 214 is allowed to flow therethrough.

Further, as shown in FIG. 4, in some embodiments at least a portion of the gate passage 270 has a decreasing cross-sectional profile in the flow direction 244 of the resin 214. This taper of at least a portion of the gate passage 270 may increase the flow rate of the resin 214 flowing therethrough before it contacts the rovings 142, which may allow the resin 214 to impinge on the rovings 142. Initial impingement of the rovings 142 by the resin 214 provides for further impregnation of the rovings, as discussed below. Further, tapering of at least a portion of the gate passage 270 may increase backpressure in the gate passage 270 and the manifold assembly 220, which may further provide more even, uniform distribution of the resin 214 to coat the rovings 142. Alternatively, the gate passage 270 may have an increasing or generally constant cross-sectional profile, as desired or required.

Upon exiting the manifold assembly 220 and the gate passage 270 of the die 150 as shown in FIG. 4, the resin 214 contacts the rovings 142 being traversed through the die 150. As discussed above, the resin 214 may substantially uniformly coat the rovings 142, due to distribution of the resin 214 in the manifold assembly 220 and the gate passage 270. Further, in some embodiments, the resin 214 may impinge on an upper surface of each of the rovings 142, or on a lower surface of each of the rovings 142, or on both an upper and lower surface of each of the rovings 142. Initial impingement on the rovings 142 provides for further impregnation of the rovings 142 with the resin 214. Impingement on the rovings 142 may be facilitated by the velocity of the resin 214 when it impacts the rovings 142, the proximity of the rovings 142 to the resin 214 when the resin exits the manifold assembly 220 or gate passage 270, or other various variables.

As shown in FIG. 4, the coated rovings 142 are traversed in run direction 282 through impregnation zone 250. The impregnation zone 250 is in fluid communication with the manifold assembly 220, such as through the gate passage 270 disposed therebetween. The impregnation zone 250 is configured to impregnate the rovings 142 with the resin 214.

For example, as discussed above, in exemplary embodiments as shown in FIGS. 4 and 12 through 18, the impregnation zone 250 includes a plurality of contact surfaces 252. The rovings 142 are traversed over the contact surfaces 252 in the impregnation zone. Impingement of the rovings 142 on the contact surface 252 creates shear and pressure sufficient to impregnate the rovings 142 with the resin 214 coating the rovings 142.

In some embodiments, as shown in FIG. 4, the impregnation zone 250 is defined between two spaced apart opposing impregnation plates 256 and 258, which may be included in the impregnation section. First plate 256 defines a first inner surface 257, while second plate 258 defines a second inner surface 259. The impregnation zone 250 is defined between the first plate 256 and the second plate 258. The contact surfaces 252 may be defined on or extend from both the first and second inner surfaces 257 and 259, or only one of the first and second inner surfaces 257 and 259.

In exemplary embodiments, as shown in FIGS. 4, 13, and 15 through 18, the contact surfaces 252 may be defined alternately on the first and second surfaces 257 and 259 such that the rovings alternately impinge on contact surfaces 252 on the first and second surfaces 257 and 259. Thus, the rovings 142 may pass contact surfaces 252 in a waveform, tortuous or sinusoidual-type pathway, which enhances shear.

Angle 254 at which the rovings 142 traverse the contact surfaces 252 may be generally high enough to enhance shear and pressure, but not so high to cause excessive forces that will break the fibers. Thus, for example, the angle 254 may be in the range between approximately 1° and approximately 30°, and in some embodiments, between approximately 5° and approximately 25°.

As stated above, contact surfaces 252 typically possess a curvilinear surface, such as a curved lobe, pin, etc. In exemplary embodiments as shown, a plurality of peaks, which may form contact surfaces 252, and valleys are thus defined. Further, in many exemplary embodiments, the impregnation zone 250 has a waveform cross-sectional profile. In one exemplary embodiment as shown in FIGS. 4, 13, and 18, the contact surfaces 252 are lobes that form portions of the waveform surfaces of both the first and second plates 256 and 258 and define the waveform cross-sectional profile. FIG. 12 illustrates the second plate 258 and the various contact surfaces thereon that form at least a portion of the impregnation zone 250 according to some of these embodiments.

In other embodiments, as shown in FIG. 14, the contact surfaces 252 are lobes that form portions of a waveform surface of only one of the first or second plate 256 or 258. In these embodiments, impingement occurs only on the contact surfaces 252 on the surface of the one plate. The other plate may generally be flat or otherwise shaped such that no interaction with the coated rovings occurs.

In other alternative embodiments, as shown in FIGS. 15 through 17, the impregnation zone 250 may include a plurality of pins (or rods) 260, each pin having a contact surface 252. The pins 260 may be static, as shown in FIGS. 15 and 16, freely rotational (not shown), or rotationally driven, as shown in FIG. 17. Further, the pins 260 may be mounted directly to the surface of the plates defining the impingement zone, as shown in FIG. 15, or may be spaced from the surface as shown in FIGS. 16 and 17. It should be noted that the pins 260 may be heated by heaters 133, or may be heated individually or otherwise as desired or required. Further, the pins 260 may be contained within the die 150, or may extend outwardly from the die 150 and not be fully encased therein.

In further alternative embodiments, the contact surfaces 252 and impregnation zone 250 may comprise any suitable shapes and/or structures for impregnating the rovings 142 with the resin 214 as desired or required.

As discussed, a roving 142 traversed through an impregnation zone 250 according to the present disclosure may become impregnated by resin 214, thus resulting in an impregnated roving 142, and thus a tape 152 comprising at least one roving 142, exiting the impregnation zone 250, such as downstream of the contact surfaces 252 in the run direction 282. The tape 152 exiting the impregnation zone 250 is formed from a fiber impregnated polymer material, as discussed above. At least one fiber roving 142 may be contained within a polymer resin 214, as discussed above, to form the fiber impregnated polymer material and resulting tape 152. Further, in exemplary embodiments of the present disclosure, such tape 152 may include a resin rich portion 302 and a fiber rich portion 304, and thus be an asymmetric tape 152.

Additionally, in exemplary embodiments, the formation and maintenance of an asymmetric tape 152 within and exited from a die 150 of the present disclosure may be facilitated through the lack of or removal of a faceplate from the die 150. In previously known dies 150, faceplates may be positioned downstream of impregnation zones 250 in the run direction 282, and may be configured to meter excess resin 214 from the rovings 142. Metering of such resin 214 may remove resin 214 included in the resin rich portion 302 from an impregnated roving 142, thus preventing an impregnated roving 142 exiting the die 150 from being asymmetric and requiring further processing of the impregnated rovings 142 to form a tape 156. Removal of such faceplates according to the present disclosure thus prevents such metering and facilitates the production of asymmetric tapes 152. Additionally, removal of the faceplate may provide further advantages. For example, removal may prevent clogging of the faceplate with resin 214, which can disrupt the traversal of rovings 142 therethrough. Additionally, removal may allow for easier access to the impregnation zone 250, and may thus make it easier to introduce and reintroduce rovings 142 to the impregnation zone 250 during start-up, after temporary disruptions such as due to breakage of a roving 142, or during any other suitable time period. Further, removal of the faceplate allows for a plurality of rovings 142 exiting a die 150 to exit as a single sheet or tape 152, rather than as separated rovings 142 due to metering through the faceplate. This could potentially eliminate the need to later form these rovings 142 into such a sheet or tape 156.

FIGS. 4, 18, and 21 through 23 illustrate embodiments of an asymmetric tape 152 according to the present disclosure. As discussed, such tape 152 may include a resin rich portion 302 and a fiber rich portion 304. In some embodiments, the tape 152 consists solely of the resin rich portion 302 and fiber rich portion 304. A tape 152 according to the present disclosure may further include for example a first surface 312 and an opposing second surface 304. The first surface 312 may, for example, be the surface that faces and contacts a component to which a tape 152, 156 is being bonded. These resin rich portion 302 and fiber rich portion 304 may in some embodiments be defined as respective halves of a tape 152, such as when viewed as a cross-section. For example, a tape 152 may have a maximum height 306 (which may be a first major diameter) and a maximum width 308 (which may be a second perpendicular or minor diameter). The height 306 may be defined as extending between the first surface 312 and the second surface 314. The height 306 may further be defined for the tape 152 when in the impregnation zone 250 from the portion of the rovings 142 contained in the tape 152 that contact a final contact surface 310. This final contact surface 310 may be the farthest downstream contact surface 252 in the run direction 282, such that it is the final point of contact in the impregnation zone 250 for the rovings 142. In some embodiments, the resin rich portion 302 may include that portion of the roving 142 within one-half of the height 306 throughout all of the width 308, and the fiber rich portion 304 may include that portion of the roving 142 within the other one-half of the height 306 throughout all of the width 308. In exemplary embodiments, for example, the resin rich portion 302 includes the one-half that is distal from the final contact surface 310, and thus includes a distal half of the cross-sectional area with respect to that final contact surface 310. In these embodiments, the fiber rich portion 304 includes the one-half that is proximal to the final contact surface 310 (and includes that portion that contacts the final contact surface 310), and thus includes a proximal half of the cross-sectional area with respect to that final contact surface 310.

In other embodiments, the resin rich portion 302 and fiber rich portion 304 may be viewed as more or less than half of a tape 152 as discussed above. For example, a resin rich portion 302 may be less than half of the tape 152, such as less than or equal to approximately 5%, 10%, 20%, 30%, or 40% of the height 306 throughout the width 308. A fiber rich portion 302 may be greater than or equal to approximately 95%, 90%, 80%, 70%, or 60% of the height 306 throughout the width 308.

A resin rich portion 302 according to the present disclosure may include relatively more resin 214 than fibers 300, while a fiber rich portion 304 may include relatively more fibers 300 than resin 214. In some embodiments, such ratio may be calculated on a per volume basis for a tape 152, or on a per surface area basis for a cross-section of a tape 152. In these embodiments, such ratio may further be calculated as an average throughout all or a portion of a tape 152, such as throughout all or a portion of the length of a tape 152 using the volume thereof or using a plurality of cross-sections.

For example, the resin rich portion 302 in some embodiments may include at least approximately 60%, 65%, 70%, 75%, 80%, 85%, or any other suitable percentage, range, or sub-range thereof of the total amount of resin 214. The total amount may include the amount in both the resin rich portion 302 and the fiber rich portion 304. In other embodiments, the ratio of resin 214 to fibers 300 in the resin rich portion 302 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 152.

Further, the fiber rich portion 304 in some embodiments may include at least approximately 60%, 65%, 70%, 75%, 80%, 85%, or any other suitable percentage, range, or sub-range thereof of the total amount of fiber 300. The total amount may include the amount in both the resin rich portion 302 and the fiber rich portion 304. In other embodiments, the ratio of fiber 300 to resin 214 in the fiber rich portion 304 may be at least approximately 1.2 to 1, 1.6 to 1, 2 to 1, 2.4 to 1, 2.8 to 1, 3.2 to 1, 3.6 to 1, 4.0 to 1, or any other suitable ratio, range, or sub-range thereof. As discussed above, the total amount or ratio may be calculated on a per volume basis or a per surface area basis for a cross-sectional area of a tape 152.

Additionally or alternatively, the resin rich portion 302 in some embodiments may include a percentage resin 214 (as opposed to fibers 300 contained in the resin rich portion 302) of at least approximately 75%, 80%, 85%, 90%, 95%, 100% or any other suitable percentage, range, or sub-range thereof. Such percentage may be calculated on a per volume basis or a per -surface area basis for a cross-sectional area of a tape 152.

Microscopy may in some embodiments be particularly useful in determining the existence of a resin rich portion 302 and a fiber rich portion 304. A microscopy image of one embodiment of any asymmetric tape 152 having a resin rich portion 302 and a fiber rich portion 304 is shown in FIG. 23. For example, a cross-section of a tape 152 can be analyzed using microscopy to determine the existence of a resin rich portion 302 and a fiber rich portion 304. Such method is particularly useful in embodiments wherein the resin rich portion 302 is less than half of the tape 152, such as less than or equal to approximately 5%, 10%, 20% of the height 305, and further is relatively devoid of fibers 300, such as containing a percentage resin 214 (as opposed to fibers 300 contained in the resin rich portion 302) of at least approximately 75%, 80%, 85%, 90%, 95%, or 100%.

It should be understood that a tape 152 according to the present disclosure may have any suitable cross-sectional shape and/or size. For example, such tape 152 may have a generally rectangular shape, or a generally oval or circular or other suitable polygonal or otherwise shape. Further, it should be understood that one or more impregnated rovings 142 having been traversed through the impregnation zone 250 may together form the tape 152, with the resin 214 of the various rovings 142 connected to form such tape 152. The various above amounts, ranges, and/or ratios may thus in exemplary embodiments be determined for a tape 152 having any suitable number of impregnated rovings 142 embedded and generally dispersed within resin 214.

As shown in, for example, FIGS. 4 and 18, an asymmetric tape 152 may be formed through contact of the rovings 142 with the plurality of contact surfaces 252 in the impregnation zone 250. In particular, contact with the final contact surface 310 may form the asymmetric tape 152 and resin rich portion 302 and fiber rich portion 304 thereof. Contact of the tape 152, including resin 214 and fibers 300 therein, with the final contact surface 310 may remove resin 214 from the portion of the tape 152 and rovings 142 therein that contacts the contact surface 310, thus removing such resin 214 from the fiber rich portion 304, while impregnating the rovings 142 therein and allowing resin 214 to remain in the resin rich portion 302. Such contact to form the resin rich portion 302 and fiber rich portion 304 may in some embodiments be further facilitated by removal or lack of a faceplate, which allows for the rovings 142 to traverse the final contact surface 310 at a suitable and desirable angle, as discussed herein, and further allows for the resin 214 surrounding the rovings 142 to be connected such that the tape 152 is formed when the fiber impregnated polymer material exits the impregnation zone 250.

As mentioned, in some embodiments no metering of an impregnated roving 142 according to the present disclosure, such as through a faceplate or otherwise, may occur in the die 150 after contact with the plurality of contact surfaces 252. In particular, no metering may occur after contact with the final contact surface 310. Thus, impregnated rovings 142 exiting the impregnation zone may form a tape 152. Further, in some embodiments, the system of the present disclosure may further include a roller 190. The roller 190 may be positioned downstream of the die 150, and may be provided in the system for rolling impregnated rovings 142 and tape 152 therethrough, as discussed above. In some embodiments, no metering of impregnated rovings 142 may occur between contact with the plurality of contact surfaces 252 by an impregnated roving 142 and contact with the roller 190 by an impregnated roving 142. In other embodiments, however, metering may occur in and/or downstream of the die 150. Such metering may be performed by a faceplate or other suitable apparatus that is designed such that metering therethrough does not eliminate the asymmetric distribution in the rovings 142 and tape 152.

To further facilitate impregnation of the rovings 142, they may also be kept under tension while present within the die 150, and specifically within the impregnation zone 250. The tension may, for example, range from about 5 to about 300 Newtons, in some embodiments from about 50 to about 250 Newtons, and in some embodiments, from about 100 to about 200 Newtons per roving 142 or tow of fibers.

As shown in FIG. 4 and FIGS. 19 and 20, in some embodiments, a land zone 280 may be positioned downstream of the impregnation zone 250 in run direction 282 of the rovings 142. The ravings 142 may traverse through the land zone 280 before exiting the die 150. In some embodiments, as shown in FIG. 19, at least a portion of the land zone 280 may have an increasing cross-sectional profile in run direction 282, such that the area of the land zone 280 increases. The increasing portion may be the downstream portion of the land zone 280 to facilitate the rovings 142 exiting the die 150. Alternatively, the cross-sectional profile or any portion thereof may decrease, or may remain constant as shown in FIG. 20.

Additionally, other components may be optionally employed to assist in the impregnation of the fibers. For example, a "gas jet" assembly may be employed in certain embodiments to help uniformly spread a roving of individual fibers, which may each contain up to as many as 24,000 fibers, across the entire width of the merged tow. This helps achieve uniform distribution of strength properties. Such an assembly may include a supply of compressed air or another gas that impinges in a generally perpendicular fashion on the moving rovings that pass across exit ports. The spread rovings may then be introduced into a die for impregnation, such as described above.

It should be understood that asymmetric tapes 152 and rovings 142 according to the present disclosure need not be formed in the dies 150 and other apparatus as discussed above. Such dies 150 and apparatus are merely disclosed as examples of suitable equipment for forming asymmetric tapes 152 and rovings 142. The use of any suitable equipment or process to form asymmetric tapes 152 and rovings 142 is within the scope and spirit of the present disclosure.

The asymmetric tapes 152 that result from use of the die and method according to the present disclosure may have a very low void fraction, which helps enhance their strength. For instance, the void fraction may be about 3% or less, in some embodiments about 2% or less, in some embodiments about 1.5% or less, in some embodiments about 1% or less, and in some embodiments, about 0.5% or less. The void fraction may be measured using techniques well known to those skilled in the art. For example, the void fraction may be measured using a "resin burn off" test in which samples are placed in an oven (e.g., at 600° C. for 3 hours) to burn out the resin. The mass of the remaining fibers may then be measured to calculate the weight and volume fractions. Such "burn off" testing may be performed in accordance with ASTM D 2584-08 to determine the weights of the fibers and the polymer matrix, which may then be used to calculate the "void fraction" based on the following equations:

$$V_f = 100 * (\rho_t - \rho_c)/\rho_t$$

where, $V_f$ is the void fraction as a percentage;

$\rho_c$ is the density of the composite as measured using known techniques, such as with a liquid or gas pycnometer (e.g., helium pycnometer);

$\rho_t$ is the theoretical density of the composite as is determined by the following equation:

$$\rho_t = 1/[W_f/\rho_f + W_m/\rho_m]$$

$\rho_m$ is the density of the polymer matrix (e.g., at the appropriate crystallinity);

$\rho_f$ is the density of the fibers;

$W_f$ is the weight fraction of the fibers; and $W_m$ is the weight fraction of the polymer matrix.

Alternatively, the void fraction may be determined by chemically dissolving the resin in accordance with ASTM D 3171-09. The "burn off" and "dissolution" methods are particularly suitable for glass fibers, which are generally resistant to melting and chemical dissolution. In other cases, however, the void fraction may be indirectly calculated based on the densities of the polymer, fibers, and tape in accordance with ASTM D 2734-09 (Method A), where the densities may be determined ASTM D792-08 Method A. Of course, the void fraction can also be estimated using conventional microscopy equipment.

As discussed above, after exiting the impregnation die 150, the impregnated rovings 142 may form a tape 152, and this tape 152 may be consolidated into a consolidated tape 156. The number of rovings employed in each tape 152, 156 may vary. Typically, however, a tape 152, 156 will contain from 2 to 20 rovings, in some embodiments from 2 to 10 rovings, in some embodiments from 3 to 5 rovings, in some embodiments from 2 to 80 rovings, in some embodiments from 10 to 60 ravings, in some embodiments from 20 to 50 rovings. In some embodiments, it may be desired that the ravings are spaced apart approximately the same distance from each other within the tape 152. In other embodiments, however, it may be desired that the rovings are combined, such that the fibers of the rovings are generally evenly distributed throughout the tape 152, such as throughout a resin rich portion and fiber rich portion as discussed above. In these embodiments, the rovings may be generally indistinguishable from each other, and a generally asymmetric tape 152 may be formed from a plurality of rovings. Referring to FIGS. 21 through 23, for example, embodiments of a tape 152 is shown that contains rovings that are combined such that the fibers are generally evenly distributed within a fiber rich portion thereof.

A relatively high percentage of fibers may be employed in a tape, and fiber reinforced thermoplastic material thereof, to provide enhanced strength properties. For instance, fibers typically constitute from about 25 wt. % to about 80 wt. %, in some embodiments from about 25 wt. % to about 90 wt. %, in some embodiments from about 30 wt. % to about 75 wt. %, in some embodiments from about 30 wt. % to about 70 wt. %, and in some embodiments, from about 35 wt. % to about 60 wt. % of the tape or material thereof. Likewise, polymer(s) typically constitute from about 20 wt. % to about 75 wt. %, in some embodiments from about 25 wt. % to about 70 wt. %, in some embodiments from about 30 wt. % to about 65 wt. %, and in some embodiments, from about 40 wt. % to about 65 wt. % of the tape 152, 156. Such percentage of fibers may additionally or alternatively by measured as a volume fraction. For example, in some embodiments, the fiber reinforced thermoplastic material may have a fiber volume fraction between approximately 25% and approximately 80%, in some embodiments between approximately 30% and approximately 70%, in some embodiments between approximately 40% and approximately 60%, and in some embodiments between approximately 45% and approximately 55%.

Tapes 152, 156 formed according to the present disclosure may in some embodiments be supplied to a pultrusion system directly from impregnation die 150, or may be supplied from spindles or other suitable storage apparatus. A tension-regulating device may be employed to help control the degree of tension in the tapes as they are drawn through the pultrusion system. An oven may be supplied in the device for heating the tapes. The tapes may then be provided to a consolidation die, which may operate to compress the ribbons together into a preform, and to align and form the initial shape of the desired product, such as a rod. If desired, a second die (e.g., calibration die) may also be employed that compresses the preform into a final shape. Cooling systems may additionally be incorporated between the dies and/or after either die. A downstream pulling device may be positioned to pull products through the system.

Tapes 152, 156 formed according to the present disclosure have a variety of advantageous characteristics. Notably, as discussed above, the resin rich portion 302 allows more efficient and stronger bonding with other components, such as pipes, etc., thus providing improved reinforcement of these components. Further, forming of tapes 152, 156 as discussed above, and in particular in dies 150 without faceplates, advantageously allows for the thickness and fiber areal weight to be controlled. For example, the roving count in a tape can be adjusted one or more rovings at a time to obtain a desired fiber areal weight and thickness. Control of these characteristics is particularly important in order to allow the tapes 152, 156 to maintain suitable flexibility as required by various applications.

Further, oxidation of various additives included in a fiber reinforced thermoplastic material formed according to the present disclosure may be advantageously identified due to discoloration of the resin rich portion 302. Such identification may allow for removal of these portions of the material.

The present disclosure is further directed to a method for forming a fiber reinforced polymer tape, which in exemplary embodiments may be an asymmetric tape having a resin rich portion 302 and a fiber rich portion 304. Forming of a tape according to the present disclosure may require impregnating at least one fiber roving 142 or a plurality of fiber rovings 142 with a polymer resin 214. Thus, the method may generally include flowing a polymer resin 214 through a manifold assembly 220. The manifold assembly 220 may include a plurality of channels or branched runners 222, as discussed above. The method may further include coating the fiber rovings 142 with the resin 214, as discussed above. Further, the method may include traversing the coated roving 142 through an impregnation zone 250 to impregnate the rovings 142 with the resin 214, as discussed above. Such traversing step may include contacting a plurality of contact surfaces 252, which includes a final contact surface 310, as discussed above.

As discussed above, in some embodiments, the step of flowing the resin 214 through the manifold assembly 220 may include flowing the resin 214 through an outlet region 242 of the manifold assembly 220. As further discussed above, the step of coating the roving 142 with the resin 214 may include flowing the resin 214 from the manifold assembly 220 through a gate passage 270. The method may further include traversing the rovings 142 from the impregnation zone 250 through a land zone 280, as discussed above. In exemplary embodiments, as discussed above, impregnated rovings 142 exiting the die 150 may include a resin rich portion 302 and a fiber rich portion 304.

As discussed, in some embodiments, no metering of an impregnated roving 142 occurs in the die 150 after impregnation, such as after contact with the plurality of contact surfaces 252. Additionally, in some embodiments, the method according to the present disclosure may further include rolling an impregnated roving 142 through a roller 190, as discussed above. In some embodiments, as discussed above, no metering of the impregnated roving 142 may occur between the traversing step and the rolling step. In other embodiments, however, metering may occur as discussed above.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An asymmetric tape, comprising:
a polymer resin; and
a plurality of unidirectional continuous fibers of at least one fiber roving embedded and distributed within the polymer resin to form a single layer of fiber reinforced polymer material, the single layer of fiber reinforced polymer material comprising a first surface and an opposing second surface, the first surface and opposing second surface being formed together during formation of the asymmetric tape in a die and exiting the die as the single layer of fiber reinforced polymer material, wherein the continuous fibers are disposed in the single layer of fiber reinforced polymer material to form a resin rich portion and a fiber rich portion, the resin rich portion including the first surface, the fiber rich portion including the second surface, the resin rich portion and the fiber rich portion each including the identical polymer resin, and wherein the asymmetrical tape having the fiber reinforced polymer material has a void fraction of approximately 2% or less.

2. The asymmetric tape of claim 1, wherein the resin rich portion comprises at least 75% resin by volume.

3. The asymmetric tape of claim 1, wherein the resin rich portion comprises at least 95% resin by volume.

4. The asymmetric tape of claim 1, wherein the fiber reinforced polymer material has a fiber volume fraction of between approximately 40% and approximately 60%.

5. The asymmetric tape of claim 1, wherein the polymer resin is a thermoplastic resin.

6. The asymmetric tape of claim 1, wherein the polymer resin is polyether ether ketone.

7. The asymmetric tape of claim 1, wherein the fibers are carbon fibers.

8. The asymmetric tape of claim 1, wherein the polymer resin is a polyamide.

9. The asymmetric tape of claim 1, wherein the fibers are S-glass fibers.

10. The asymmetric tape of claim 1, wherein the fibers are E-glass fibers.

* * * * *

UNITED STATES PATENT AND TRADEMARK OFFICE
CERTIFICATE OF CORRECTION

PATENT NO.       : 9,624,350 B2
APPLICATION NO.  : 13/707645
DATED            : April 18, 2017
INVENTOR(S)      : Aaron H. Johnson et al.

It is certified that error appears in the above-identified patent and that said Letters Patent is hereby corrected as shown below:

In the Drawings

Sheet 18, Figs. 22 and 23, the reference numerals 312 and 314 should be applied to the first and second surfaces of the tape 152 as shown on the attached sheet In the Specification Column 2, Line 7 "...for tapes methods..." should read --...for tapes and methods...--

Column 2, Line 31 "...The impregnation zone comprising a plurality..." should read --...The impregnation zone comprises a plurality...--

Column 4, Line 57 "...150. The ravings..." should read --...150. The rovings...--

Column 5, Line 1 "...continuous fiber ravings..." should read --...continuous fiber rovings...--

Column 6, Line 31 "...which may comprises the fiber..." should read --...which may comprise the fiber...--

Column 6, Line 56 "...ravings 142..." should read --...rovings 142...--

Column 6, Line 58 "...214. The ravings 142..." should read --...214. The rovings 142...--

Column 8, Line 4 "...on the ravings 142..." should read --...on the rovings 142...--

Column 11, Line 24 "...second surface 304..." should read --...second surface 314...--

Column 11, Line 62 "...portion 302 may be..." should read --...portion 304 may be...--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,624,350 B2

Column 12, Line 53 "...5%, 10%, 20% of the height 305,..." should read --...5%, 10%, 20% of the height 306,...--

Column 13, Line 56 "...the rovings 142. The ravings 142..." should read --...the rovings 142. The rovings 142...--

Column 14, Line 60 "...densities may be determined ASTM D792.08..." should read --...densities may be determined with ASTM D792.08...--

Column 15, Line 4 "...from 10 to 60 ravings,..." should read --...from 10 to 60 rovings,...--

Column 15, Line 6 "...ravings are spaced..." should read --...rovings are spaced...--

In the Claims

Claim 1 (Column 17, Lines 11 and 12) "...wherein the asymmetical tape having the fiber reinforced polymer material has avoid fraction..." should read --...wherein the asymmetric tape having the fiber reinforced polymer material has a void fraction...--

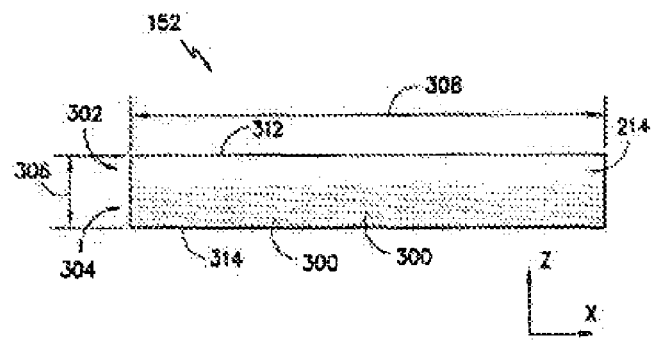
FIG. -22-
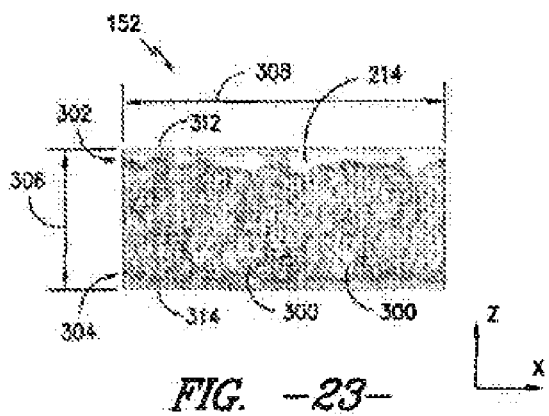
FIG. -23-